(12) United States Patent
Yokoyama et al.

(10) Patent No.: US 9,202,107 B2
(45) Date of Patent: *Dec. 1, 2015

(54) IMAGE PROCESSING APPARATUS AND IMAGE PROCESSING METHOD

(71) Applicant: SONY CORPORATION, Tokyo (JP)

(72) Inventors: Kazuki Yokoyama, Kanagawa (JP);
Takahiro Sakaguchi, Kanagawa (JP);
Tomoichi Fujisawa, Kanagawa (JP);
Masayuki Tsumura, Tokyo (JP);
Mitsuharu Hoshino, Chiba (JP)

(*) Notice: Subject to any disclaimer, the term of this patent is extended or adjusted under 35 U.S.C. 154(b) by 4 days.

This patent is subject to a terminal disclaimer.

(21) Appl. No.: 14/150,075

(22) Filed: Jan. 8, 2014

(65) Prior Publication Data

US 2014/0119607 A1 May 1, 2014

Related U.S. Application Data

(63) Continuation of application No. 12/869,115, filed on Aug. 26, 2010, now Pat. No. 8,660,320.

(30) Foreign Application Priority Data

Oct. 23, 2009 (JP) .................. 2009-244660

(51) Int. Cl.
*G06K 9/00* (2006.01)
*H04N 5/14* (2006.01)

(52) U.S. Cl.
CPC ........ *G06K 9/00228* (2013.01); *G06K 9/00221* (2013.01); *H04N 5/142* (2013.01)

(58) Field of Classification Search
CPC ................................. G06K 9/00221
USPC ....................................... 382/118
See application file for complete search history.

(56) References Cited

U.S. PATENT DOCUMENTS

| | | | | |
|---|---|---|---|---|
| 6,724,943 | B2* | 4/2004 | Tsuchiya et al. | 382/261 |
| 6,975,759 | B2* | 12/2005 | Lin | 382/167 |
| 7,082,211 | B2* | 7/2006 | Simon et al. | 382/118 |
| 7,127,122 | B2* | 10/2006 | Ogata et al. | 382/260 |
| 7,265,785 | B2* | 9/2007 | Hamasaki | 348/242 |
| 7,755,670 | B2* | 7/2010 | Utagawa | 348/222.1 |
| 7,853,086 | B2* | 12/2010 | Kitamura | 382/224 |
| 7,903,148 | B2* | 3/2011 | Yokoyama et al. | 348/222.1 |
| 7,929,042 | B2* | 4/2011 | Terashima | 348/345 |
| 8,081,239 | B2* | 12/2011 | Zhang et al. | 348/241 |
| 8,089,525 | B2* | 1/2012 | Takayama | 348/222.1 |
| 8,199,203 | B2* | 6/2012 | Sugimoto | 348/208.14 |
| 8,228,397 | B2* | 7/2012 | Katagiri et al. | 348/222.1 |
| 8,340,367 | B2* | 12/2012 | Suzuki et al. | 382/118 |
| 2006/0228040 | A1* | 10/2006 | Simon et al. | 382/254 |
| 2007/0036429 | A1* | 2/2007 | Terakawa | 382/159 |
| 2008/0050022 | A1* | 2/2008 | Okada et al. | 382/209 |
| 2009/0169168 | A1* | 7/2009 | Ishikawa | 386/52 |
| 2010/0053367 | A1* | 3/2010 | Nanu et al. | 348/224.1 |
| 2011/0091107 | A1* | 4/2011 | Sugihara | 382/173 |
| 2012/0114179 | A1* | 5/2012 | Okada et al. | 382/103 |

* cited by examiner

*Primary Examiner* — Utpal Shah
(74) *Attorney, Agent, or Firm* — Sony Corporation

(57) ABSTRACT

An image processing apparatus includes: a data processing section which processes input image data and obtains output image data; a face detecting section which detects a face image on the basis of the input image data and obtains information about a face image region in which the face image exists; and a processing controller which controls the process of the data processing section on the basis of the information about the face image region obtained in the face detecting section.

23 Claims, 22 Drawing Sheets

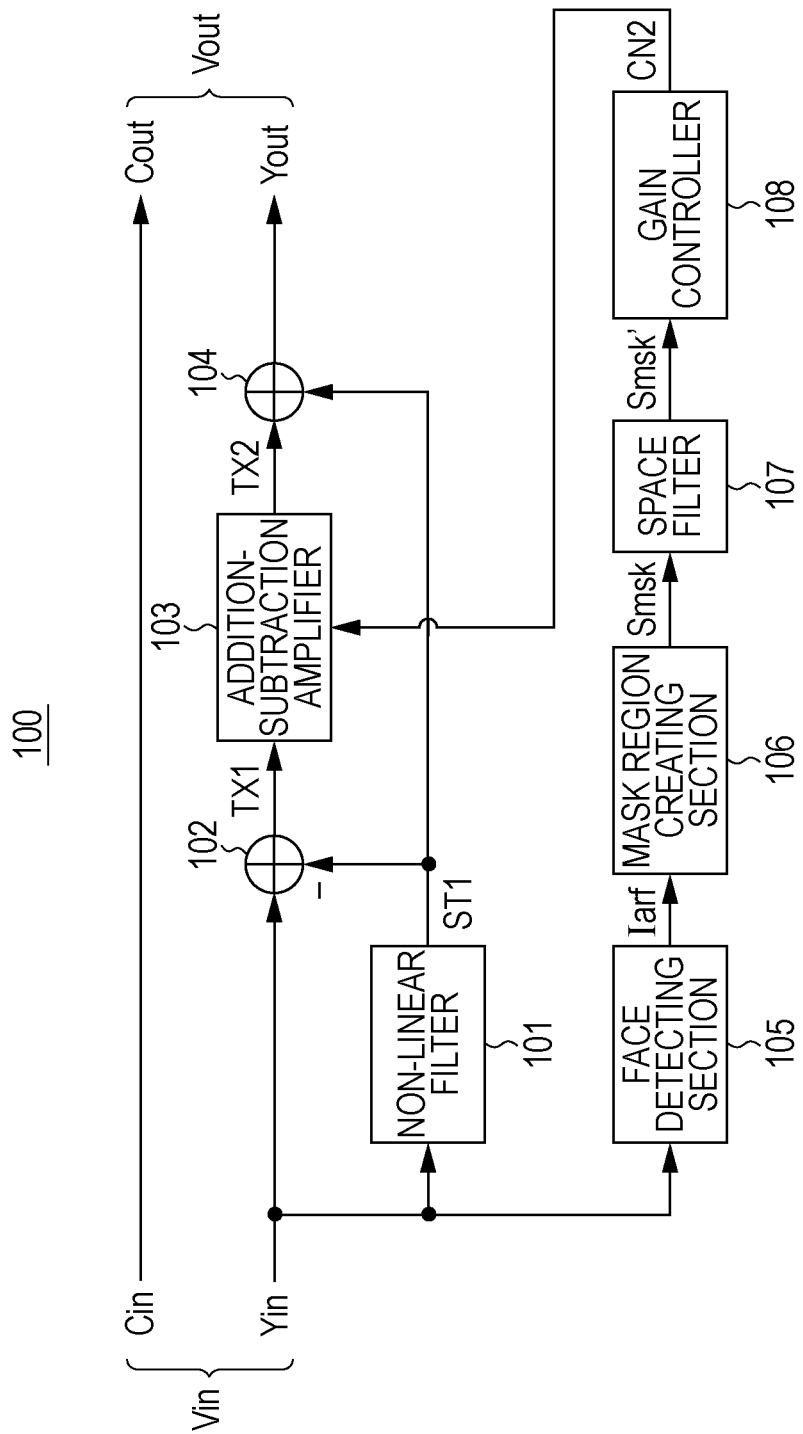

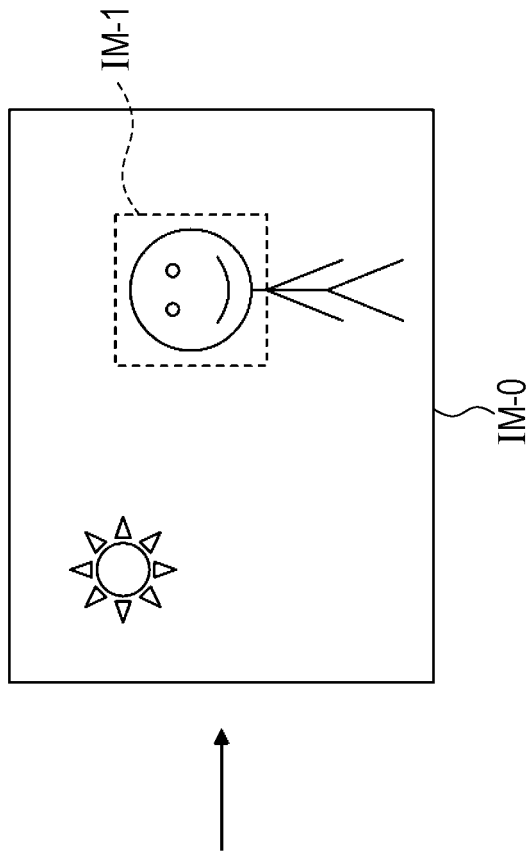
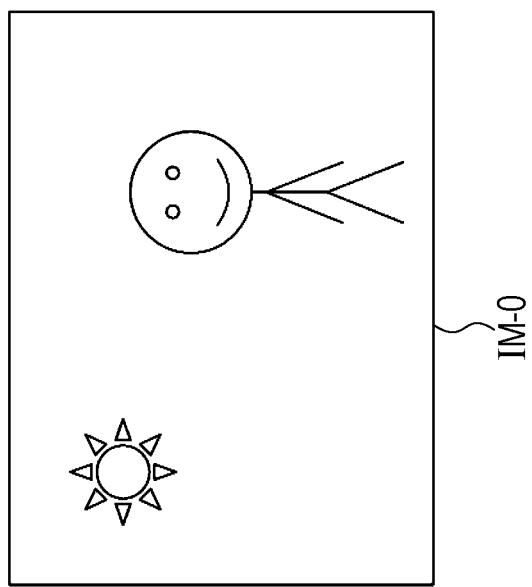

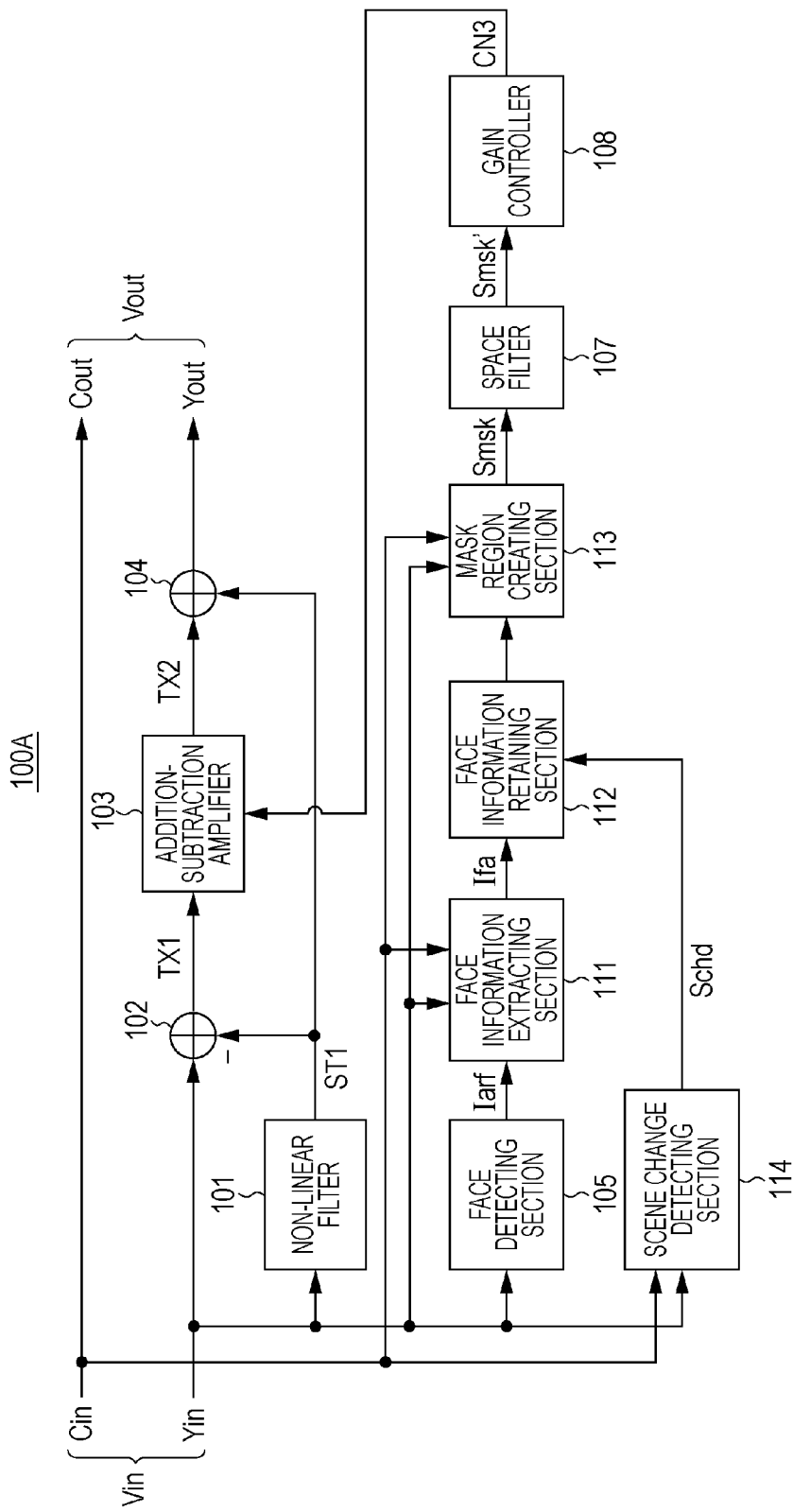

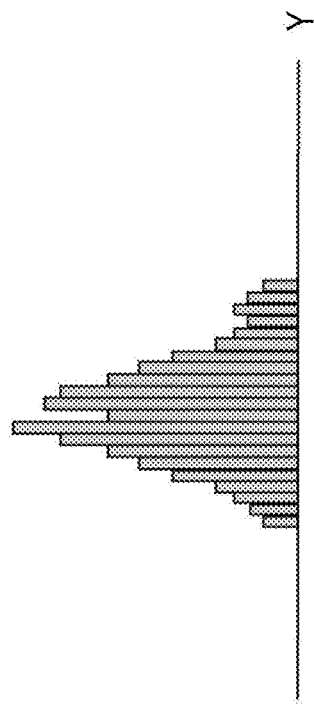
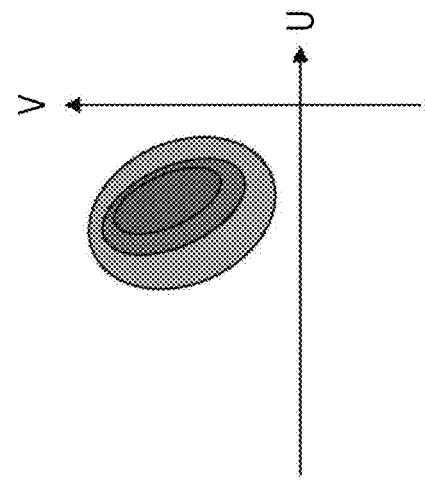
FIG. 10B
FIG. 10A

IMAGE PROCESSING APPARATUS AND IMAGE PROCESSING METHOD

CROSS-REFERENCE TO RELATED APPLICATIONS

The present application is a continuation application of U.S. patent application Ser. No. 12/869,115 filed on Aug. 26, 2010, which claims priority to and benefit from Japanese Priority Patent Application JP 2009-244660 filed in the Japan Patent Office on Oct. 23, 2009. The entire contents of each of which are incorporated herein by reference.

BACKGROUND OF THE INVENTION

1. Field of the Invention

The present invention relates to an image processing apparatus and an image processing method, and more particularly, to an image processing apparatus and an image processing method which can perform a process using a detection result of a face image region.

2. Description of the Related Art

In the related art, there has been proposed a technique in which an edge in which the change of a pixel value is sharp is kept without change, the part other than the edge is smoothed, and an amplitude component obtained by subtracting a smoothed component from an input signal is amplified, so as to independently perform an image process for components which do not include the edge (refer to Japanese Unexamined Patent Application Publication No. 2001-298621, for example).

FIG. 22 illustrates a configuration example of an image processing apparatus 200 corresponding to an image processing apparatus as disclosed in Japanese Unexamined Patent Application Publication No. 2001-298621. This image processing apparatus 200 includes a non-linear filter 201, a subtractor 202, an addition-subtraction amplifier 203, and an adder 204.

An input image data Vin is supplied to the non-linear filter 201. The non-linear filter 201 is configured, for example, using an ε (epsilon) filter. In the non-linear filter 201, the input image data Vin is smoothed while keeping an edge, and a structure component ST1 which is smoothed data is generated. Further, the input image data Vin is supplied to the subtractor 202. The structure component ST1 generated in the non-linear filter 201 is also supplied to the subtractor 202. In the subtractor 202, the structure component ST1 is subtracted from the input image data Vin, and a texture component TX1 is obtained as output data.

The texture component TX1 obtained in the subtractor 202 is supplied to the addition-subtraction amplifier 203. In the addition-subtraction amplifier 203, the texture component TX1 is amplified to obtain a texture component TX2. The gain of the addition-subtraction amplifier 203 is adjusted by a user manipulation, for example. The texture component TX2 obtained in the addition-subtraction amplifier 203 is supplied to the adder 204. To the adder 204 is also supplied the structure component ST1 generated in the non-linear filter 201. In the adder 204, the texture component TX2 is added to the structure component ST1 to obtain output image data Vout.

In the image processing apparatus 200 shown in FIG. 22, the output image data Vout in which low amplitude components other than the edge component are emphasized is obtained while keeping the edge component of the input image data Vin. For this reason, it is possible to enhance the texture without damaging the sharpness of the entire screen. However, in this image processing apparatus 200, since the gain of the addition-subtraction amplifier 203 is indiscriminate over the entire screen, the emphasis may be excessive for a face image to thereby induce a feeling of strangeness in the image.

Thus, in the related art, there has been proposed a technique which detects a skin color region and performs control so as to suppress the emphasis level in the skin color region compared with other regions to obtain an appropriate texture (refer to Japanese Unexamined Patent Application Publication No. 2003-348615, for example).

FIG. 23 illustrates a configuration example of an image processing apparatus 200A corresponding to an image processing apparatus as disclosed in Japanese Unexamined Patent Application Publication No. 2003-348615. This image processing apparatus 200A includes a skin-chromaticity detector 205 and a gain controller 206, in addition to a non-linear filter 201, a subtractor 202, an addition-subtraction amplifier 203 and an adder 204.

The sections of the non-linear filter 201, the subtractor 202, the addition-subtraction amplifier 203 and the adder 204 of image processing apparatus 200A are the same as in the image processing apparatus 200 as shown in FIG. 22, and thus, detailed description thereof will be omitted.

An input image data Vin is supplied to the skin-chromaticity detector 205. In the skin-chromaticity detector 205, the skin-chromaticity is detected for every pixel on the basis of the input image data Vin. The value of the skin-chromaticity is the maximum for a predetermined skin color and decrease with increasing departure from the predetermined skin color. The skin-chromaticity detected in the skin-chromaticity detector 205 in this way is supplied to the gain controller 206. In the gain controller 206, a gain control signal CN1 corresponding to the skin-chromaticity is obtained in the correspondence relation as shown in FIG. 24, for example.

The gain control signal CN1 obtained in the gain controller 206 is supplied to the addition-subtraction amplifier 203. In this case, the gain of the addition-subtraction amplifier 203 becomes a value proportional to the level of the gain control signal CN1. For this reason, the gain of the addition-subtraction amplifier 203 is suppressed in an image region where the skin-chromaticity is high. Accordingly, the emphasis level is suppressed in a face image region compared with other regions to thereby obtain an appropriate texture.

SUMMARY OF THE INVENTION

In the image processing apparatus 200A as shown in FIG. 23, a face image may be beyond a predetermined skin color range in the case of images having low illuminance or the like. In this case, the emphasis level is not suppressed in the face image region, thereby resulting in failure to obtain an appropriate texture in the face image region.

Further, in the case of a contrast correction, when a contrast control is performed for an overall screen based on luminance information about the entire screen or the like, an underexposure may occur in a face of a figure which is a main subject. In addition, even in the case of a color correction for color saturation, color tone or the like, when a control is performed for color saturation, color tone or the like of the overall screen based on color saturation information, color tone information or the like of the entire screen, the face color correction may similarly induce a feeling of strangeness.

It is desirable to provide an image processing apparatus and an image processing method which can effectively control the texture, sharpness, luminance, color or the like of a face image.

According to an embodiment of the present invention, there is provided an image processing apparatus including: a data processing section which processes input image data and obtains output image data; a face detecting section which detects a face image region in which a face image exists on the basis of the input image data; and a processing controller which controls the process of the data processing section on the basis of information about the face image region detected in the face detecting section.

With this configuration, the input image data is processed by the data processing section to obtain the output image data. Further, the face image region in which the face image exists is detected by the face detecting section on the basis of the input image data. In addition, the process of the data processing section is controlled by the processing controller on the basis of information about the face image region detected in the face detecting section. In this way, since the process of the data processing section is controlled on the basis of information about the face image region, the texture, sharpness, luminance, color or the like of the face image can be effectively controlled.

In this embodiment, for example, the processing controller may include: a face information extracting section which extracts image information about the face image from the input image data on the basis of the information about the face image region detected in the face detecting section; and an image region detecting section which detects an image region in which an image corresponding to the image information extracted in the face information extracting section exists, on the basis of the input image data, and may control the process of the data processing section on the basis of the information about the image region detected in the image region detecting section.

In this case, a face image region, in which a face image which is not detected in the face detecting section, exists, is included in the image region detected in the image region detecting section. Thus, even in a case where a false negative of the face image region occurs in the face detecting section, it is possible to effectively control the texture, sharpness, luminance, color or the like of all the face images included in the image. Further, in this case, even though several frames are necessary for the detection of the face detecting section, a face image region in which a face image in a current frame in the input image data exists is included in the image region detected in the image region detecting section. Thus, even in a case where the input image data is moving image data and the face image region is moving, it is possible to effectively control the texture, sharpness, luminance, color or the like of the face image.

Further, in this embodiment, for example, the face detecting section may detect the face image region in which the face image exists, for every frame, on the basis of the input image data. The face information extracting section of the processing controller extracts the image information about the face image from the input image data on the basis of the information about the face image region detected in the face detecting section, for every frame. The processing controller may further include a face information retaining section which retains the image information extracted in the face information extracting section. The image region detecting section of the processing controller may detect an image region in which an image corresponding to the image information retained in the face information retaining section exists on the basis of the input image data.

In this case, even though there is a frame in which the face image region is not detected in the face detecting section, since the face image information is retained in the face information retaining section, it is possible for the image region detecting section to stably detect the image region using the face image information retained in the face information retaining section. Thus, a robust control less dependent on the detection capability of the face detecting section can be achieved as the control for the texture, sharpness, luminance, color or the like of the face image.

Further, in this embodiment, for example, the apparatus may further include an image state change detecting section which detects a change in an image state on the basis of the input image data, and the face information retaining section of the processing controller may retain the image information extracted in the face information extracting section whenever the change in the image state is detected in the image state change detecting section. The image information about the face image extracted in the face information extracting section is in nearly the same state during the time period where the image state is not changed. Here, the change in the image state may include a scene change, an illumination change or the like, for example. Thus, even though the image information about the face image is updated in the face information retaining section whenever the image state is changed, this causes no problems, to thereby lessen the CPU processing load.

Further, in this embodiment, for example, the data processing section may include: a smoothing section which smoothes the input image data while keeping an edge to generate a smoothed image data; a subtracting section which subtracts the smoothed image data generated in the smoothing section from the input image data; an amplifying section which amplifies output data of the subtracting section; and an adding section which adds the smoothed image data generated in the smoothing section to the output data of the amplifying section to obtain the output image data, and the processing controller may control a gain of the amplifying section.

In this case, the output image data is obtained in which low amplitude components other than an edge component are emphasized while keeping the edge component of the input image data. Further, the gain of the amplifying section is controlled to become different between the face image region and other regions. For example, the gain of the amplifying section is suppressed in the face image region compared with other regions, to thereby obtain an appropriate texture. Accordingly, in this case, it is possible to enhance the texture of the image without damaging the sharpness of the overall screen, and further, to appropriately control the texture of the face image.

Further, in this embodiment, for example, the data processing section may include: a high frequency component extracting section which extracts a high frequency component from the input image data; an amplifying section which amplifies the high frequency component extracted in the high frequency component extracting section; and an adding section which adds output data of the amplifying section to the input image data to obtain the output image data, and the processing controller may control a gain of the amplifying section.

In this case, the output image data is obtained in which the high frequency component of the input image data is emphasized. Further, the gain of the amplifying section is controlled so that the face image region and other regions are different from each other. For example, the gain of the amplifying section is suppressed in the face image region compared with other regions, to thereby achieve an appropriate sharpness. Accordingly, in this case, it is possible to enhance the sharpness of the image, and further, to appropriately control the sharpness of the face image.

Further, in this embodiment, for example, the data processing section may include a color saturation adjusting section which performs a color saturation adjustment process for the input image data to obtain the output image data. The processing controller may include: a face information extracting section which extracts image information about the face image from the input image data on the basis of the information about the face image region detected in the face detecting section; and an image region detecting section which detects an image region in which an image corresponding to the image information extracted in the face information extracting section exists, on the basis of the input image data, and may control a color saturation adjustment amount in the color saturation adjusting section on the basis of color saturation information included in the information about the image region detected in the image region detecting section and the image information extracted in the face information extracting section.

Further, in this embodiment, for example, the data processing section may include a color saturation adjusting section which performs a color saturation adjustment process for the input image data to obtain the output image data. The processing controller may include a face information extracting section which extracts image information about the face image from the input image data on the basis of the information about the face image region detected in the face detecting section, and may control a color saturation adjustment amount in the color saturation adjusting section on the basis of color saturation information included in the image information extracted in the face information extracting section.

In this case, the color saturation adjustment processing is performed for the input image data by the color saturation adjusting section to obtain the output image data. The color saturation adjustment amount in the color saturation adjusting section is controlled on the basis of the color saturation information included in the image information about the face image. Accordingly, in this case, the color saturation of the face image can be appropriately controlled. Further, the color saturation adjustment can be performed for the face image or the entire image including the face image.

Further, in this embodiment, for example, the data processing section may include a color tone adjusting section which performs a color tone adjustment process for the input image data to obtain the output image data. The processing controller may include: a face information extracting section which extracts image information about the face image from the input image data on the basis of the information about the face image region detected in the face detecting section; and an image region detecting section which detects an image region in which an image corresponding to the image information extracted in the face information extracting section exists, on the basis of the input image data, and may control a color tone adjustment amount in the color tone adjusting section on the basis of color tone information included in the information about the image region detected in the image region detecting section and the image information extracted in the face information extracting section.

Further, in this embodiment, for example, the data processing section may include a color tone adjusting section which performs a color tone adjustment process for the input image data to obtain the output image data. The processing controller may include a face information extracting section which extracts image information about the face image from the input image data on the basis of the information about the face image region detected in the face detecting section, and may control a color tone adjustment amount in the color tone adjusting section on the basis of color tone information included in the image information extracted in the face information extracting section.

In this case, the color tone adjustment processing is performed for the input image data by the color tone adjusting section to obtain the output image data. The color tone adjustment amount in the color tone adjusting section is controlled on the basis of the color tone information included in the image information about the face image. Accordingly, in this case, the color tone of the face image can be appropriately controlled. Further, the color tone adjustment can be performed for the face image or the entire image including the face image.

Further, in this embodiment, for example, the data processing section may include a contrast correcting section which performs a contrast correction for the input image data on the basis of an input and output characteristic curve for the contrast correction to obtain the output image data. The processing controller may include: a face information extracting section which extracts image information about the face image from the input image data on the basis of the information about the face image region detected in the face detecting section; and a luminance information extracting section which extracts luminance information about an entire screen on the basis of the input image data, and may control the input and output characteristic curve for the contrast correction used in the contrast correcting section on the basis of luminance information included in the image information extracted in the face information extracting section and the luminance information extracted in the luminance information extracting section.

In this case, the contrast correction is performed by the contrast correcting section for the input image data on the basis of the input and output characteristic curve for the contrast correction to obtain the output image data. The input and output characteristic curve for the contrast correction in the contrast correcting section is controlled on the basis of the luminance information about the entire screen and the luminance information included in the image information about the face image. Accordingly, in this case, the luminance of the face image can be appropriately controlled.

Further, in this embodiment, for example, the data processing section may include: a smoothing section which smoothes the input image data while keeping an edge to generate a smoothed image data; a subtracting section which subtracts the smoothed image data generated in the smoothing section from the input image data; an amplifying section which amplifies output data of the subtracting section; a contrast correcting section which performs a contrast correction for the smoothed image data generated in the smoothing section on the basis of an input and output characteristic curve for the contrast correction; and an adding section which adds output data of the contrast correcting section to the output data of the amplifying section to obtain the output image data. The processing controller may further include a luminance information extracting section which extracts luminance information about an entire screen on the basis of the input image data, may control a gain of the amplifying section on the basis of the information about the image region detected in the image region detecting section, and may control the input and output characteristic curve for the contrast correction used in the contrast correcting section on the basis of luminance information included in the image information extracted in the face information extracting section and the luminance information extracted in the luminance information extracting section.

In this case, the output image data is obtained in which low amplitude components other than an edge component are emphasized while keeping the edge component of the input image data. Further, the gain of the amplifying section is controlled to be different between the face image region and the other regions. For example, the gain of the amplifying section is suppressed in the face image region compared with other regions, to thereby obtain an appropriate texture. Accordingly, in this case, it is possible to enhance the texture of the image without damaging the sharpness of the overall screen, and further, to appropriately control the texture of the face image.

Further, in this case, the contrast correction is performed by the contrast correcting section for the smoothed image data generated in the smoothing section. The input and output characteristic curve for the contrast correction in the contrast correcting section is controlled on the basis of the luminance information about the entire screen and the luminance information included in the image information about the face image. Accordingly, in this case, the luminance of the face image can be appropriately controlled without emphasizing noise.

According to the embodiments of the present invention, since the process of the data processing section is controlled on the basis of the information about the face image region, it is possible to effectively control the texture, sharpness, luminance, color or the like of the face image.

BRIEF DESCRIPTION OF THE DRAWINGS

FIG. 1 is a block diagram illustrating a configuration example of an image processing apparatus according to a first embodiment of the present invention.

FIGS. 3A and 3B are diagrams illustrating a detection example of a frame image and a face image.

FIG. 9 is a diagram illustrating a configuration example of an image processing apparatus according to a second embodiment of the present invention.

FIGS. 10A and 10B are diagrams illustrating a luminance histogram and a two-dimensional UV histogram which is an example of image information about a face image.

DESCRIPTION OF THE PREFERRED EMBODIMENTS

Hereinafter, embodiments of the present invention will be described. The description will be made in the following order.

Figure 21:
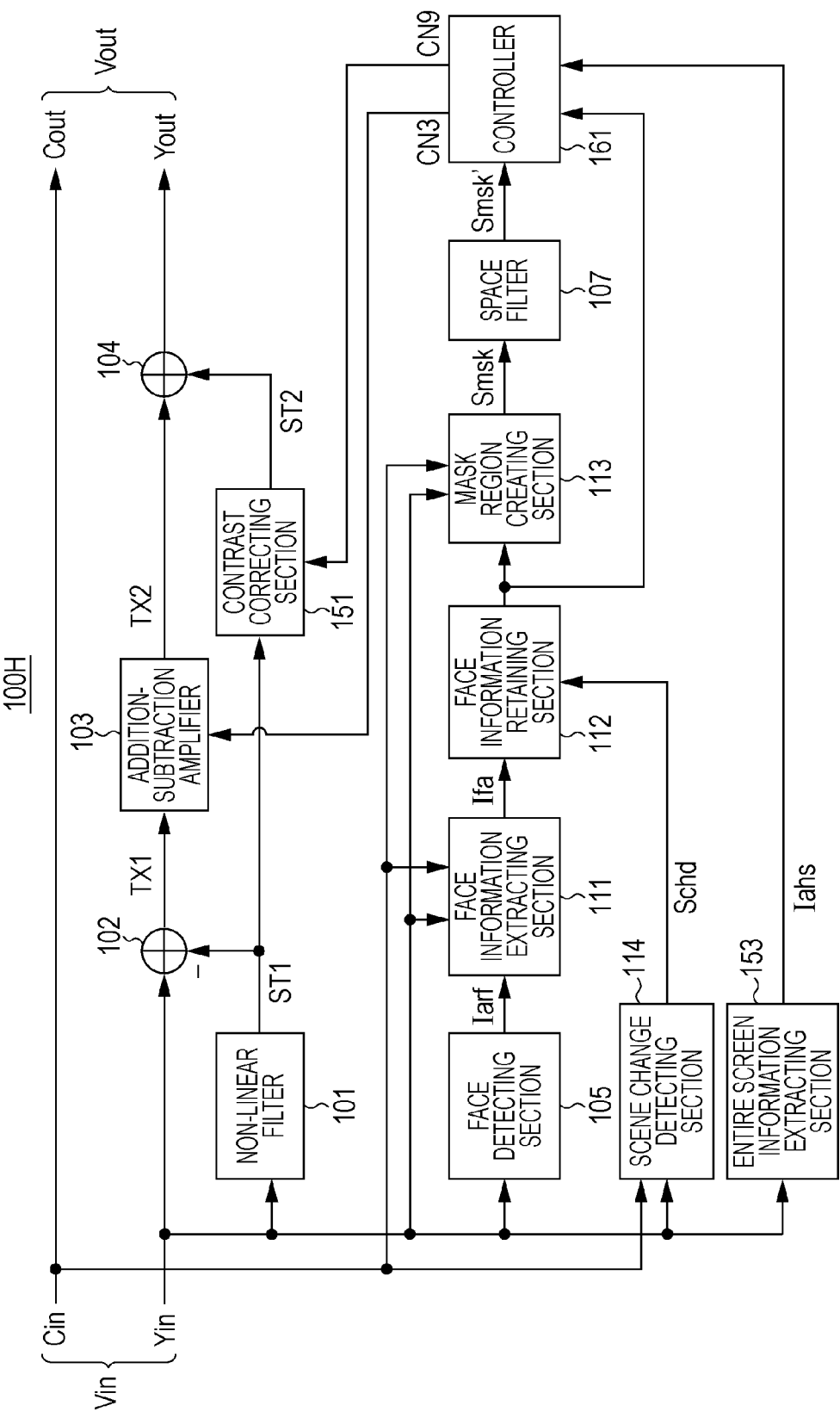
FIG. 21 is a diagram illustrating a configuration example of an image processing apparatus according to a ninth embodiment of the present invention.
Figure 22:
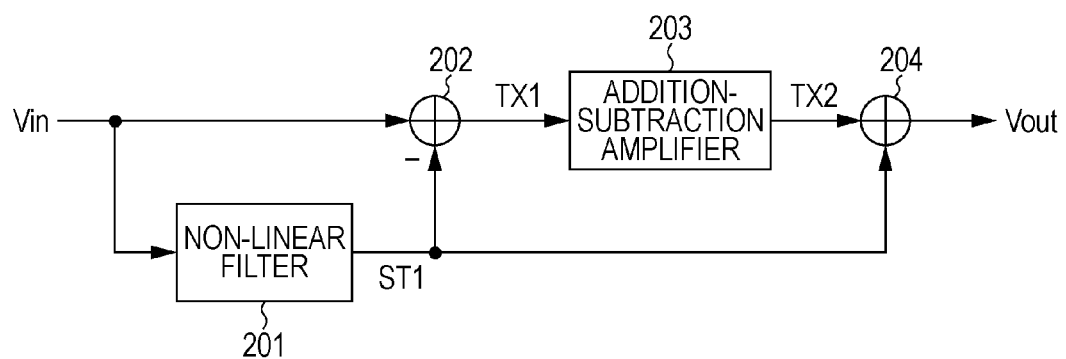
FIG. 22 is a diagram illustrating a configuration example of an image processing apparatus in the related art.
Figure 23:
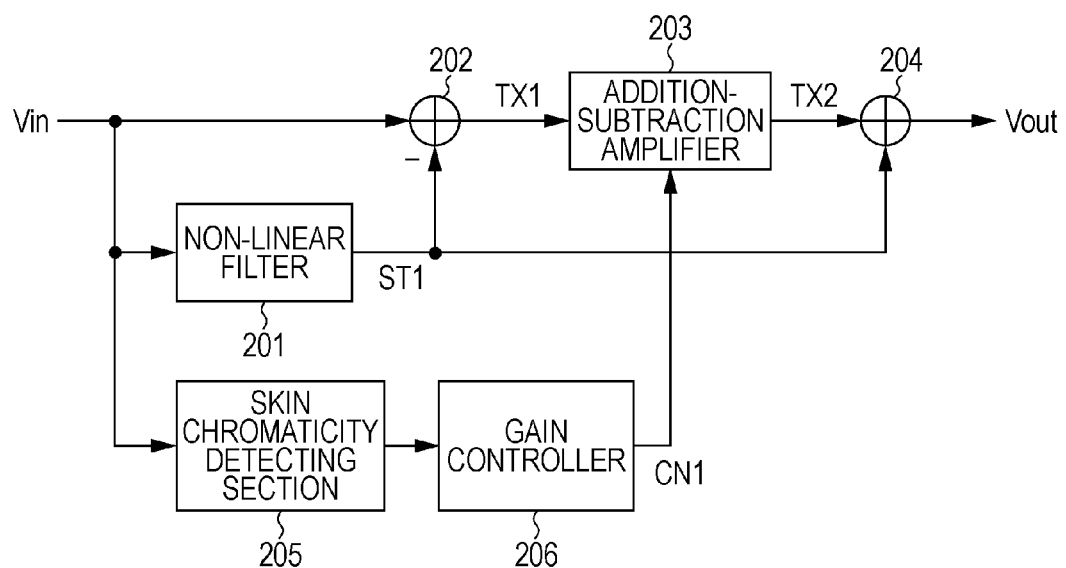
FIG. 23 is a diagram illustrating another configuration example of an image processing apparatus in the related art.
Figure 24:
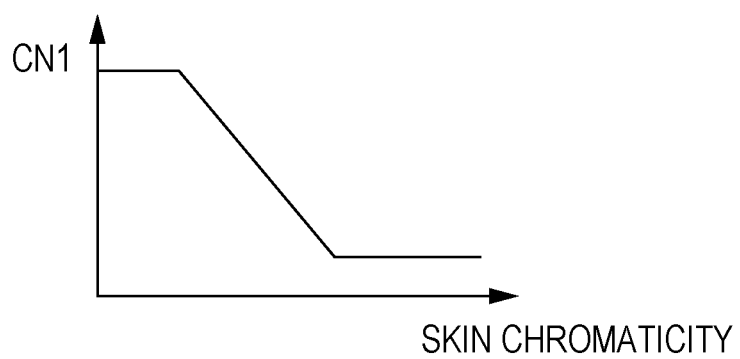
FIG. 24 is a diagram illustrating an example of the correspondence relation between skin chromaticity and a gain control signal.

1. First embodiment (FIG. 1)
2. Second embodiment (FIG. 9)
3. Third embodiment (FIG. 12)
4. Fourth embodiment (FIG. 13)
5. Fifth embodiment (FIG. 14)
6. Sixth embodiment (FIG. 15)
7. Seventh embodiment (FIG. 16)
8. Eighth embodiment (FIG. 17)
9. Ninth embodiment (FIG. 21)

First Embodiment

Configuration of Image Processing Apparatus

FIG. 1 is a diagram illustrating a configuration example of an image processing apparatus 100 according to a first embodiment. The image processing apparatus 100 includes a non-linear filter 101, a subtractor 102, an addition-subtraction amplifier 103, and an adder 104. Further, the image processing apparatus 100 includes a face detecting section 105, a mask region creating section 106, a space filter 107, and a gain controller 108.

The non-linear filter 101 is made of an ϵ filer, for example. The non-linear filter 101 smoothes input luminance data Yin for forming an input image data Vin while keeping an edge, and generates a structure component ST1 which is smoothed data. The subtractor 102 subtracts the structure component ST1 generated in the non-linear filter 101 from the input luminance data Yin, to obtain a texture component TX1 which is output data.

The addition-subtraction amplifier 103 amplifies the texture component TX1 obtained in the subtractor 102 to obtain a texture component TX2 which is amplified as the output data. The adder 104 adds the texture component TX2 obtained in the addition-subtraction amplifier 103 to the structure component ST1 generated in the non-linear filter 201 to obtain output luminance data Yout.

The face detecting section 105 detects a face image for each frame on the basis of the input luminance data Yin, and obtains information Iarf about a face image region where the face image exists. For example, the face detecting section 105 scans an image of each frame while sliding a detection frame with a plurality of resolutions to detect the face image, and obtains information about the detection frame including the face image as the information Iarf about the face image region. However, the present invention is not limited to this method. Details of the face detecting section 105 will be described later.

The mask region creating section 106 creates a mask region signal Smsk, for example, which becomes a high level in the face image region and becomes a low level in other regions, on the basis of the information Iarf about the face image region obtained in the face detecting section 105. The space filter 107 performs a low pass filter process for the mask region signal Smsk created in the mask region creating section 106, in the horizontal direction and the vertical direction. A portion of the mask region signal Smsk of which the level is rapidly changed in the horizontal direction and the vertical direction is smoothly changed by the space filter 107.

The gain controller 108 generates a gain control signal CN2 corresponding to a mask region signal Smsk' after filtering obtained in the space filter 107 and then supplies the gain control signal CN2 to the addition-subtraction amplifier 103. In this case, the gain of the addition-subtraction amplifier 103 becomes a value proportional to the level of the gain control signal CN2.

Figure 2A:
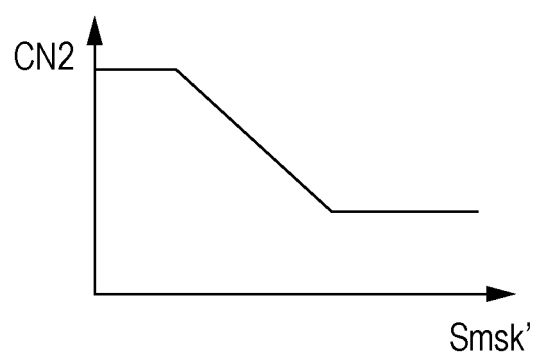
FIGS. 2A and 2B are diagrams illustrating an example of the correspondence relation between a mask region signal and a gain control signal.
Figure 2B:
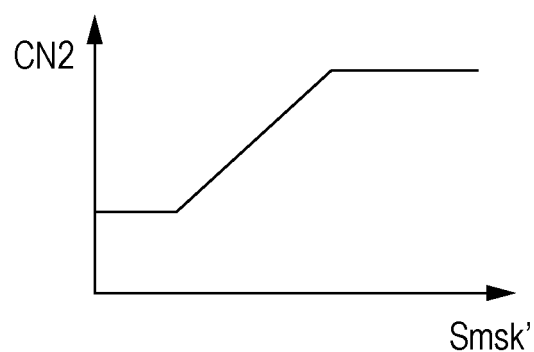

The gain controller 108 generates the gain control signal CN2 corresponding to the mask region signal Smsk', for example, in the correspondence relation shown in FIG. 2A, or in the correspondence relation shown in FIG. 2B, according to a display mode selection manipulation of a user. The correspondence relation in FIG. 2A is used in a case where a display mode in which the gain of the addition-subtraction amplifier 103 is increased to enhance texture is selected. In this case, the texture is increased as a whole, but since the gain of the addition-subtraction amplifier 103 is relatively suppressed in the face image region, an appropriate texture is obtained without inducing a feeling of strangeness. Further, the correspondence relation in FIG. 2B is used in a case where a display mode in which the gain of the addition-subtraction amplifier 103 is decreased to suppress the texture at an appropriate level is selected. In this case, the texture is relatively suppressed as a whole, but since the gain of the addition-subtraction amplifier 103 is relatively increased in the face image region, the texture is improved.

[Face Detecting Section]

The face detecting section 105 detects the face image by scanning a frame image while sliding the detection frame, for example, with a plurality of solutions, for every frame, on the basis of the input luminance data Yin. Further, the face detecting section 105 obtains information about the detection frame including the face image (position information and size information) as the information Iarf about the face image region. For example, the face detecting section 105 detects a face image IM-1 included in a frame image IM-0, which is surrounded by a broken line frame in FIG. 3B, when the frame image IM-0 is shown as in FIG. 3A.

Figure 4:
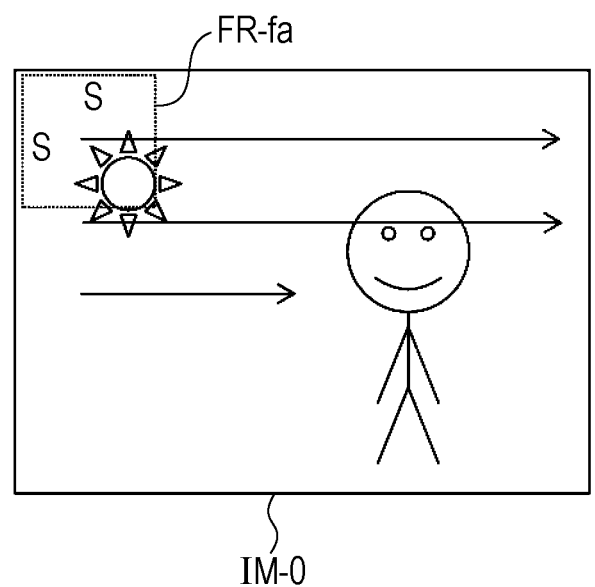
FIG. 4 is a diagram illustrating an example of a detection process of a face image in a face detecting section.

An example of the detection process of the face image in the face detecting section 105 will be described. In this detection process, as shown in FIG. 4, a detection frame FR-fa having a predetermined size, for example, a horizontal size of an S pixel and a vertical size of an S pixel is set on the frame image IM-0. As indicated by an arrow in FIG. 4, the detection frame FR-fa scans on the frame image IM-0, so that the position thereof is sequentially changed. Further, with respect to an image surrounded by the detection frame FR-fa of each position, a face score SCORE_fa is measured using a face dictionary, and it is determined whether the image is the face image based on the face score SCORE_fa.

Figure 5B:
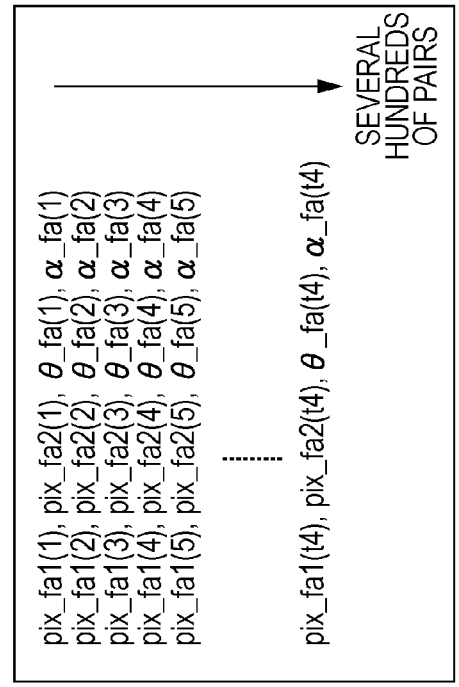
FIGS. 5A and 5B are diagrams illustrating a face dictionary for face detection and a face score measurement.
Figure 6:
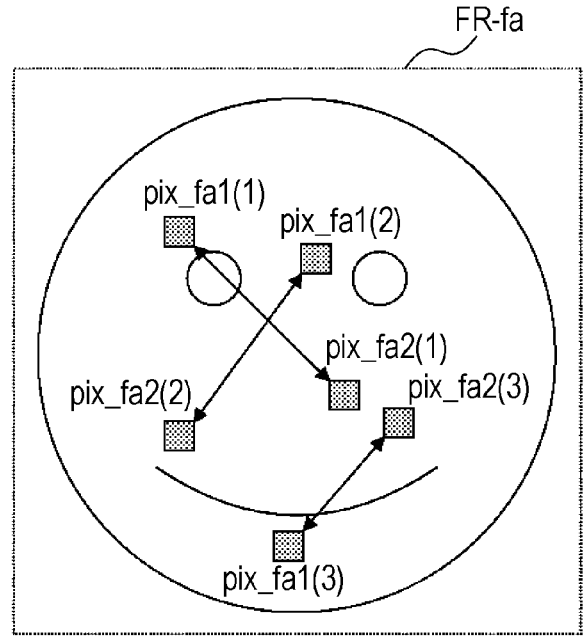
FIG. 6 is a diagram illustrating contents of a face dictionary.

As shown in FIG. 5B, the face dictionary includes a combination of t4 sets (several hundreds of pairs) of pix_fa1(i), pix_fa2(i), θ_fa(i) and α_fa(i). Here, the pix_fa1(i) and pix_fa2(i) represent positions of two points in an image surrounded by the detection frame FR-fa, as shown in FIG. 6. For simplicity of the illustration, FIG. 6 shows only three sets. The θ_fa(i) represents a threshold value relating to the difference between a luminance value of the pix_fa1(i) and a luminance value of the pix_fa2(i). Further, the α_fa(i) represents a weight which is added or subtracted on the basis of the comparison result between the difference of the luminance value of the pix_fa1(i) and the luminance value of the pix_fa2 (i), and the threshold value θ_fa(i). Detailed description about each value of the pix_fa1(i), pix_fa2(i), θ_fa(i) and α_fa(i) is omitted, which are learned and obtained by a machine learning algorithm such as AdaBoost.

Figure 5A:
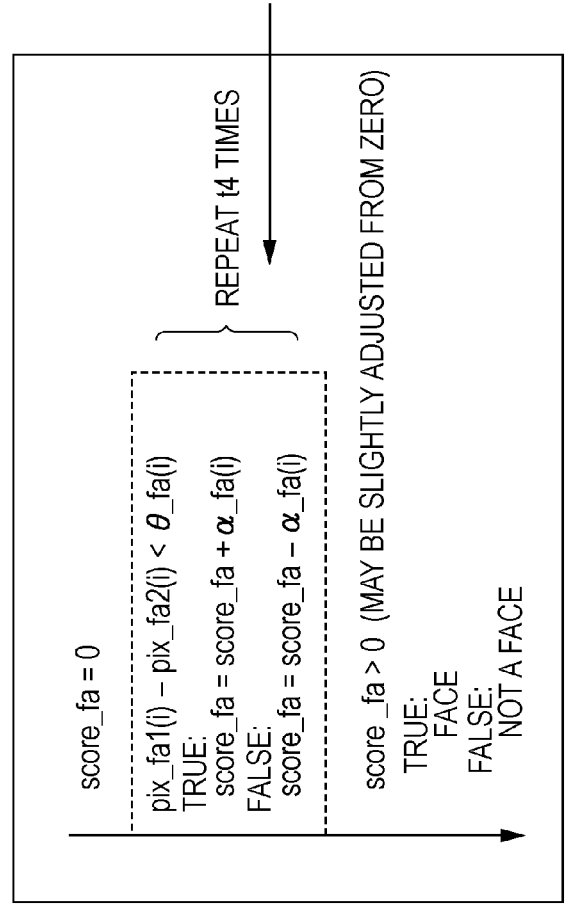

In the measurement of the face score SCORE_fa, as shown in FIG. 5A, it is determined whether or not the formula (1) is satisfied with respect to each set of pix_fa1(i), pix_fa2(i), θ_fa(i) and α_fa(i) of the face dictionary. Further, in a case where the formula (1) is satisfied in this measurement, the operation of the formula (2) is performed. On the other hand, in a case where the formula (1) is not satisfied, the operation of the formula (3) is performed. In the formula (1), the pix_fa1(i) represents a luminance value of its position, and the pix_fa2(i) represents a luminance value of its position.

$$pix\_fa1(i) - pix\_fa2(i) < \theta\_fa(i) \tag{1}$$

$$SCORE\_fa = SCORE\_fa + \alpha\_fa(i) \tag{2}$$

$$SCORE\_fa = SCORE\_fa - \alpha\_fa(i) \tag{3}$$

It is determined whether or not the image surrounded by the detection frame FR-fa is a face image, on the basis of the face score SCORE_fa measured as described above. Further, in the measurement of the face score SCORE_fa, if in a case where the formula (1) is satisfied, h(i)=1, whereas in a case where the formula (1) is not satisfied, h(i)=−1. In this case, the measured face score SCORE_fa is expressed as the formula (4).

$$SCORE\_fa = \sum_i h(i)\alpha\_fa(i) \tag{4}$$

When the face score SCORE_fa is larger than 0, it is determined that the image surrounded by the detection frame FR-fa is the face image. On the other hand, when the face score SCORE_fa is equal to or smaller than 0, it is determined that the image surrounded by the detection frame FR-fa is not the face image. A determination reference may not be 0, but may be a value which is slightly adjusted from 0.

Figure 7:
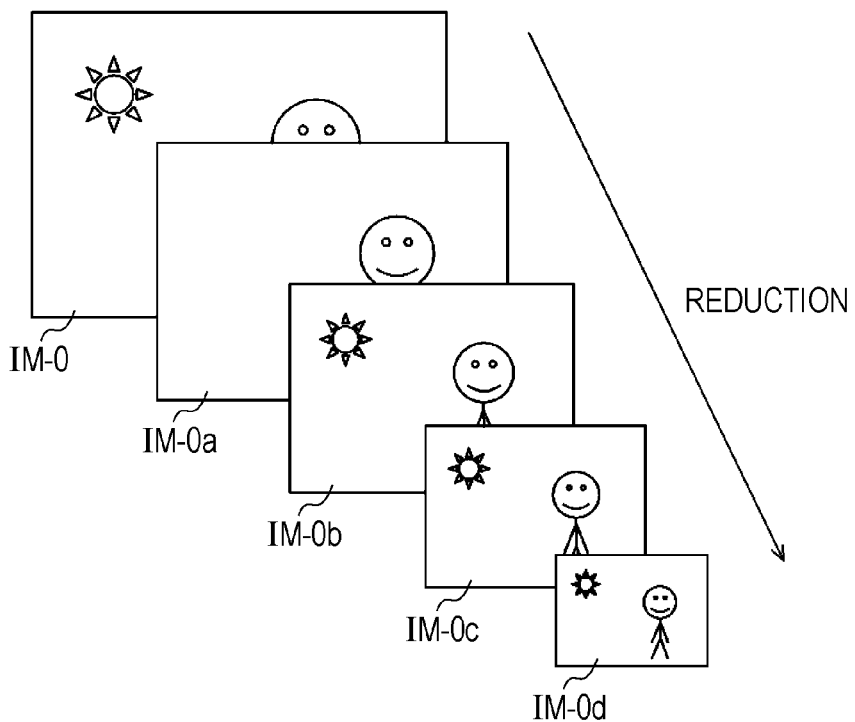
FIG. 7 is a diagram illustrating a reduced image for a detection process of a face image.

The face image included in the frame image can have a variety of sizes. For this reason, as shown in FIG. 4, when a detection frame FR-fa having a predetermined size is set on the frame image IM-0 to detect the face image, only the face image corresponding to the size of the detection frame FR-fa in the face image included in the frame image IM-0 can be detected. In order to detect the variety of face images included in the frame image IM-0, the detection process of the face image as described above is performed with respect to reduced images IM-0a, IM-0b, and so on obtained by appropriately reducing the frame image IM-0, in addition to the frame image IM-0, as shown in FIG. 7.

Figure 8:
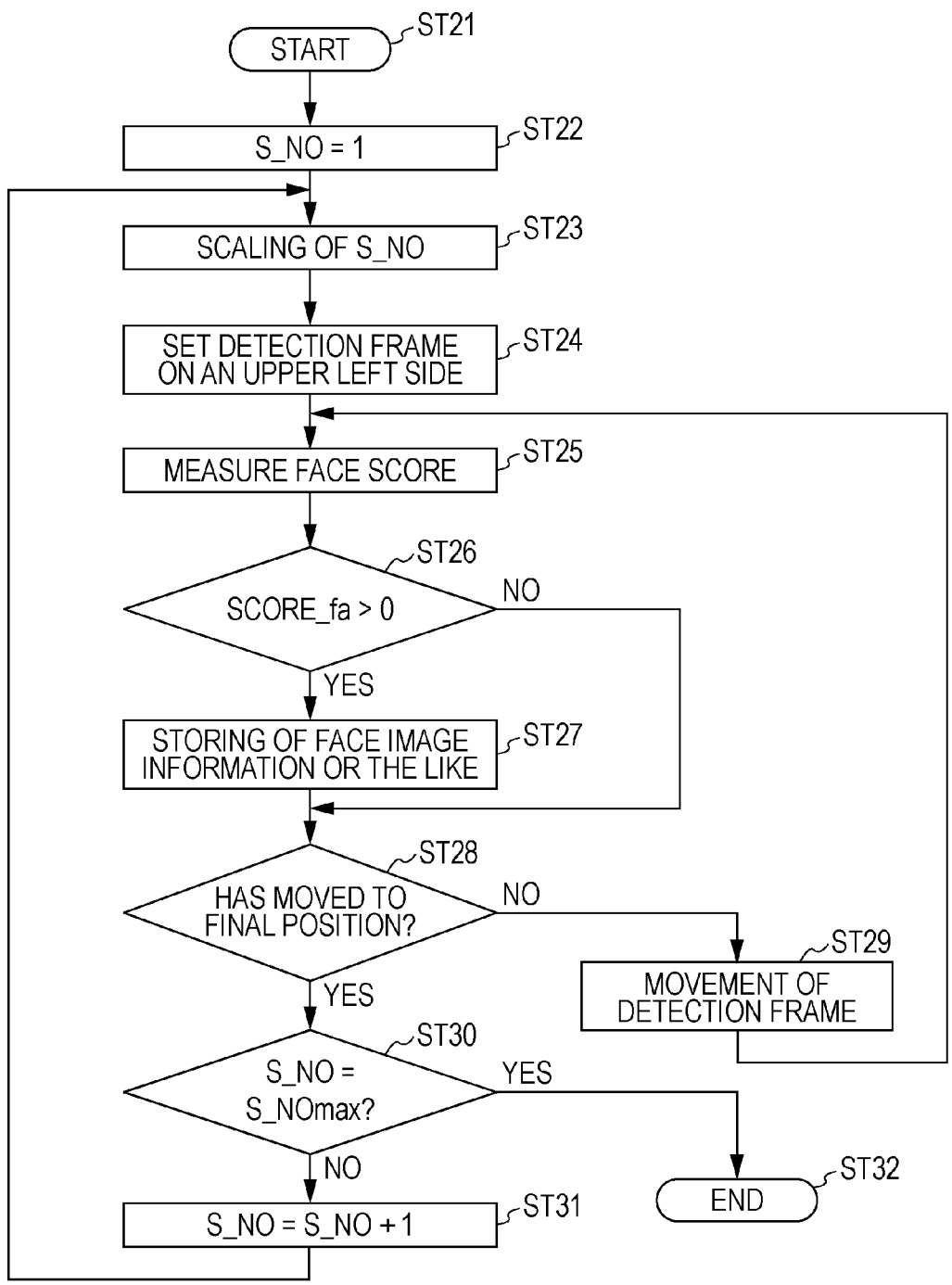
FIG. 8 is a flowchart illustrating an exemplary procedure of a face image detection process in a face detecting section.

FIG. 8 is a flowchart illustrating a procedure of the face image detection process in the face detecting section 102.

The face detecting section 105 starts the face image detection process in step ST21, and then proceeds to step ST22. In step ST22, the face detecting section 105 sets a reduction step S_NO of the frame image IM-0 to 1. Then, in step ST23, the face detecting section 105 performs scaling (reduction) of the reduction step S_NO with respect to the frame image IM-0, to thereby generate the reduced image (reduced frame image) for detecting the face image.

When S_NO=1, the reduction ratio is 1, the reduced image for detecting the face image is the same as the frame image IM-0. Further, as the reduction step S_NO is increased, the reduction ratio is decreased. The face image detected in the reduced image having a smaller reduction ratio becomes a larger face image in the still image frame IM-0. Further, the face detection frame information (position information and size information) is based on the frame image IM-0.

Next, in step ST24, the face detecting section 105 sets the detection frame FR-fa on an upper left side on the reduced image generated in step ST23. Further, in step ST25, the face detecting section 105 measures the face score SCORE_fa using the face dictionary as described above.

Then, in step ST26, the face detecting section 105 determines whether the image surrounded by the detection frame FR-fa is the face image on the basis of the face score SCORE_fa measured in step ST25. In this case, the face detecting section 105 determines that the image is the face image when the SCORE_fa is larger than 0, and determines that the image is not the face image when the SCORE_fa is not larger than 0.

When it is determined that the image is the face image, the face detecting section 105 proceeds to step ST27. In step ST27, the face detecting section 105 adds a face ID to the face detection frame information (position information and size information) and stores the result in a storage section (not shown). After the process of step ST27, the face detecting section 105 proceeds to step ST28.

When it is determined that the image is not the face image in step ST26, the face detecting section 105 directly proceeds to step ST28. In step ST28, the face detecting section 105 determines whether the detection frame FR-fa moves to a final position. When the detection frame FR-fa does not move to the final position, the face detecting section 105 moves the detection frame FR-fa to the next position in step ST29, and then returns to step ST25 to repeat the same procedure as described above. Further, the detection frame FR-fa moves by one pixel in the horizontal direction in a certain vertical position. If the movement in the horizontal direction in the vertical position is finished, the detection frame FR-fa moves one pixel in the vertical direction and then moves to the next vertical position.

When the detection frame FR-fa moves to the final position in step ST28, the face detecting section 105 determines whether the reduction step S_NO is in a final step S_NOmax in step ST30. When the reduction step S_NO is not the final step S_NOmax, the face detecting section 105 sets the reduction step S_NO to the next step in step ST31, and then returns to step ST23 to repeat the same procedure as described above. Further, in step ST30, when the reduction step S_NO is the final step S_NOmax, since the detection process of the face image in all the reduction steps S_NO is finished, the face detecting section 105 terminates the face image detection process in step ST32.

An operation of the image processing apparatus 100 in FIG. 1 will be described. The input luminance data Yin for forming the input image data Vin is supplied to the non-linear filter 101. In the non-linear filter 101, the input luminance data Yin is smoothed with the edge being kept, and the structure component ST1 is generated as the smoothed data.

Further, the input luminance data Yin is supplied to the subtractor 102. The structure component ST1 generated in the non-linear filter 101 is also supplied to the subtractor 102. The subtractor 102 subtracts the structure component ST1 from the input luminance data Yin to obtain the texture component TX1 which is the output data.

The texture component TX1 obtained in the subtractor 102 is supplied to the addition-subtraction amplifier 103. The addition-subtraction amplifier 103 amplifies the texture component TX1 to obtain the amplified texture component TX2. A basic gain of the addition-subtraction amplifier 103 is determined by the display mode selection manipulation of the user as described above, for example.

The texture component TX2 obtained in the addition-subtraction amplifier 103 is supplied to the adder 104. The structure component ST1 generated in the non-linear filter 101 is also supplied to the adder 104. The adder 104 adds the texture component TX2 to the structure component ST1 to obtain output luminance data Yout for forming output image data Vout. Further, input color data (red color difference data and blue color difference data) Cin for forming the input image data Vin becomes output color data Cout for forming the output image data Vout, without change.

Further, the input luminance data Yin for forming the input image data Vin is supplied to the face detecting section 105. The face detecting section 105 detects the face image for each frame on the basis of the input luminance data Yin, and obtains the information Iarf about the face image region in which the face image exists, for example, the face detection frame information (position and size information). The information Iarf about the face image region is supplied to the mask region creating section 106. The mask region creating section 106 creates the mask region signal Smsk, for example, which becomes the high level in the face image region and becomes the low level in other regions, on the basis of the information Iarf about the face image region.

The mask region signal Smsk created in the mask region creating section 106 is input to the space filter 107, which then performs the low pass filter process for the mask region signal Smsk in the horizontal direction and in the vertical direction. Through this process, a portion of the mask region signal Smsk of which the level is rapidly changed in the horizontal direction and the vertical direction is smoothly changed by the space filter 107. The mask region signal Smsk' after filtering obtained in the space filter 107 is supplied to the gain controller 108.

The gain controller 108 generates the gain control signal CN2 corresponding to the mask region signal Smsk' and supplies the gain control signal CN2 to the addition-subtraction amplifier 103. In this case, the gain of the addition-subtraction amplifier 103 becomes a value proportional to the level of the gain control signal CN2.

For example, the gain controller 108 generates, in a case where the display mode for enhancing the texture by increasing the basic gain of the addition-subtraction amplifier 103 is selected, the gain control signal CN2 corresponding to the mask region signal Smsk' in the correspondence relation shown in FIG. 2A. For this reason, in this case, since the basic gain of the addition-subtraction amplifier 103 is increased, the texture is enhanced as a whole. However, in the face image region, the gain control signal CN2 becomes small, and thus, the gain of the addition-subtraction amplifier 103 is relatively suppressed. Accordingly, it is possible to prevent a feeling of strangeness due to excessively emphasized texture in the face image, to thereby obtain an appropriate texture.

Further, for example, the gain controller 108 generates, in a case where the display mode for relatively suppressing the texture by decreasing the basic gain of the addition-subtraction amplifier 103 is selected, the gain control signal CN2 corresponding to the mask region signal Smsk' in the correspondence relation shown in FIG. 2B. For this reason, in this case, since the basic gain of the addition-subtraction amplifier 103 is decreased, the texture is relatively suppressed as a whole. However, in the face image region, the gain control signal CN2 becomes large, and thus, the gain of the addition-subtraction amplifier 103 is relatively increased. Accordingly, the texture is increased for the face image which is a main subject to thereby obtain an appropriate texture.

As described above, the image processing apparatus 100 shown in FIG. 1 generates the gain control signal CN2 of the addition-subtraction amplifier 103 in the gain controller 108, on the basis of the information Iarf about the face image region obtained in the face detecting section 105. For this reason, in the face image region where the face image exists, the gain of the addition-subtraction amplifier 103 is controlled at a relatively low or high level with respect to other regions. Accordingly, regardless of the level of the overall texture due to the basic gain setting of the addition-subtraction amplifier 103, it is possible to obtain an appropriate texture for the face image.

Further, in the image processing apparatus 100 shown in FIG. 1, the mask region signal Smsk created in the mask region creating section 106 is input to the space filter 107, which then performs the low pass filter process for the mask region signal Smsk in the horizontal direction and the vertical direction. Through this process, the portion of the mask region signal Smsk of which the level is rapidly changed in the horizontal direction and the vertical direction is smoothly changed. Thus, the gain control signal CN2 generated in the gain controller 108 is not rapidly changed in a boundary between the face image region and other regions, and thus, the boundary can be prevented from standing out.

Second Embodiment

Configuration of Image Processing Apparatus

FIG. 9 is a diagram illustrating a configuration example of an image processing apparatus 100A according to a second embodiment. In FIG. 9, elements corresponding to those in FIG. 1 are given the same reference numerals. The image processing apparatus 100A includes a non-linear filer 101, a subtractor 102, an addition-subtraction amplifier 103, and an adder 104. Further, the image processing apparatus 100A includes a face detecting section 105, a face information extracting section 111, a face information retaining section 112, a mask region creating section 113, a space filter 107, a gain controller 108, and a scene change detecting section 114.

In the image processing apparatus 100A, the non-linear filter 101, the subtractor 102, the addition-subtraction amplifier 103, the adder 104, the face detecting section 105, the space filter 107 and the gain controller 108 are the same as in the image processing apparatus 100 as shown in FIG. 1, and thus detailed description thereof will be omitted.

The face information extracting section 111 extracts image information Ifa about a face image from input luminance data Yin and input color data Cin for forming input image data Vin, on the basis of information Iarf about a face image region obtained in the face detecting section 105 for each frame. In this embodiment, the face image extracting section 111 obtains, for example, information about a luminance histogram and a two-dimensional UV histogram of the face image region, as the face image information Ifa.

That is, the face image extracting section 111 creates a luminance histogram as shown in FIG. 10B, using luminance data of each pixel corresponding to the face image region, in the input luminance data Yin. Further, the face image extracting section 111 creates a two-dimensional UV histogram as shown in FIG. 10A, using color data (red color difference data U and blue color difference data V) of each pixel corresponding to the face image region, in the input color data Cin.

The face information retaining section 112 retains the image information Ifa about the face image extracted in the face information extracting section 111. The face information extracting section 111 extracts the image information Ifa about the face image, as described above, from the frame in which the information Iarf about the face image region is obtained in the face detecting section 105. The face information retaining section 112 may update the retaining contents of the image information Ifa about the face image for each frame in which the image information Ifa about the face image is extracted from the face information extracting section 111.

However, the image information Ifa about the face image extracted in the face information extracting section 111 is in approximately the same state when an image state is not changed. For this reason, in this embodiment, the face information retaining section 112 updates the retaining contents of the image information Ifa about the face image extracted in the face information extracting section 111, whenever a change in the image state is detected. In this embodiment, as will be described later, a change in the image state due to the scene change is exemplified as the change in the image state, but a change in the image state due to an illumination change or the like may be considered.

The mask region creating section 113 detects the image region in which the image corresponding to the image information Ifa about the face image retained in the face information retaining section 112 exists, on the basis of the input luminance data Yin and the input color data Cin for each frame. In this case, the mask region creating section 113 determines a predetermined range having a high frequency as a luminance value range and a UV value range, respectively, with reference to information about the luminance histogram and the two-dimensional UV histogram, which is the image information Ifa about the face image. The mask region creating section 113 performs the determination process of the luminance value range and the UV value range, for example, whenever the retaining contents of the face information retaining section 112 are updated.

The mask region creating section 113 detects pixels in which the luminance value and the UV value are in the determined luminance value range and UV value range on the basis of the input luminance data Yin and the input color data Cin, for each frame. Further, the mask region creating section 113 detects a region of each detected pixel as the image region in which the image corresponding to the image information Ifa about the face image exists.

The image region detected in the mask region creating section 113 in this way is re-configured on the basis of the image information Ifa about the face image, which will be referred to as a "re-configured image region". The mask region creating section 113 creates a mask region signal Smsk on the basis of the information about the re-configured image region. That is, the mask region creating section 113 creates the mask region signal Smsk, for example, which becomes a high level in the re-configured face image region and becomes a low level in other regions.

The scene change detecting section 114 detects the scene change on the basis of the input luminance data Yin and the input color data Cin, and sends the detection signal Schd to the face information retaining section 112. The scene change detecting section 114 detects the scene change using a characteristic vector including a plurality of vector elements obtained by processing pixel data of the frame image for each divided block, or a luminance or color difference histogram or the like obtained by processing the pixel signal of the frame image. The other configuration of the image processing apparatus 100A shown in FIG. 9 is the same as in the image processing apparatus shown 100 in FIG. 1.

An operation of the image processing apparatus 100A shown in FIG. 9 will be described. The input luminance data Yin for forming the input image data Vin is supplied to the non-linear filter 101. The non-linear filter 101 smoothes the input luminance data Yin while keeping an edge and generates a structure component ST1 which is smoothed data.

Further, the input luminance data Yin is supplied to the subtractor 102. The structure component ST1 generated in the non-linear filter 101 is also supplied to the subtractor 102. The subtractor 102 subtracts the structure component ST1 from the input luminance data Yin to obtain a texture component TX1 which is output data.

The texture component TX1 obtained in the subtractor 102 is supplied to the addition-subtraction amplifier 103. The addition-subtraction amplifier 103 amplifies the texture component TX1 to obtain an amplified texture component TX2. The basic gain of the addition-subtraction amplifier 103 is determined, for example, according to a display mode selection manipulation of a user.

The texture component TX2 obtained in the addition-subtraction amplifier 103 is supplied to the adder 104. The structure component ST1 generated in the non-linear filter 101 is also supplied to the adder 104. The adder 104 adds the texture component TX2 to the structure component ST1 to obtain output luminance data Yout for forming output image data Vout. Further, input color data (red color difference data and blue color difference data) Cin for forming the input image data Vin becomes output color data Cout for forming the output image data Vout without change.

Further, the input luminance data Yin for forming the input image data Vin is supplied to the face detecting section 105. The face detecting section 105 detects the face image for each frame on the basis of the input luminance data Yin, and obtains information Iarf about the face image region where the face image exists, for example, face detection frame information (position information and size information). The information Iarf about the face image region is supplied to the face information extracting section 111.

The face information extracting section 111 extracts the image information Ifa about the face image from the input luminance data Yin and the input color data Cin on the basis of the information Iarf about the face image region obtained in the face detecting section 105 for each frame. For example, in the face image extracting section 111, the luminance histogram and the two-dimensional UV histogram of the face image region are measured as the face image information Ifa. In this way, the image information Ifa about the face image extracted in the face information extracting section 111 is supplied to the face information retaining section 112.

The face information retaining section 112 retains the image information Ifa about the face image supplied from the face information extracting section 111. In this case, the face information retaining section 112 updates the retained contents of the image information Ifa about the face image extracted in the face information extracting section 111, whenever a scene change is detected on the basis of the scene change detection signal Schd from the scene change detecting section 114 whenever the image state is changed.

The mask region creating section 113 detects the image region where the image corresponding to the image information Ifa about the face image retained in the face information retaining section 112 exists as the re-configured image region, on the basis of the input luminance data Yin and the input color data Cin for each frame. Further, the mask region creating section 113 creates the mask region signal Smsk, for example, which becomes a high level in the re-configured face image region on the basis of the information about re-configured image region and becomes a low level in other regions.

The mask region signal Smsk created in the mask region creating section 113 is input to the space filter 107, which then performs the low pass filter process for the mask region signal Smsk in the horizontal direction and the vertical direction. Through this process, a portion of the mask region signal Smsk of which the level is rapidly changed in the horizontal direction and the vertical direction is smoothly changed. The mask region signal Smsk' after filtering obtained by the space filter 107 is supplied to the gain controller 108.

The gain controller 108 generates a gain control signal CN3 corresponding to the mask region signal Smsk' and supplies the gain control signal CN3 to the addition-subtraction amplifier 103. In this case, the gain of the addition-subtraction amplifier 103 becomes a value proportional to the level of the gain control signal CN3.

For example, in a case where a display mode for increasing the basic gain of the addition-subtraction amplifier 103 to improve the texture is selected, the gain controller 108 generates the gain control signal CN3 corresponding to the mask region signal Smsk', in the correspondence relation shown in FIG. 2A. For this reason, in this case, since the basic gain of the addition-subtraction amplifier 103 is increased, the texture is increased as a whole, but in the re-configured face image region, the gain control signal CN3 becomes small and the gain of the addition-subtraction amplifier 103 is relatively suppressed. Accordingly, it is possible to prevent a feeling of strangeness due to excessively emphasized texture in the face image, to thereby obtain an appropriate texture.

Further, for example, in a case where a display mode in which the basic gain of the addition-subtraction amplifier 103 is decreased to relatively suppress the texture is selected, the gain controller 108 generates the gain control signal CN3 corresponding to the mask region signal Smsk' in the correspondence relation in FIG. 2B. For this reason, in this case, since the basic gain of the addition-subtraction amplifier 103 is decreased, the texture is relatively suppressed as a whole, but in the re-configured face image region, the gain control signal CN3 becomes large and the gain of the addition-subtraction amplifier 103 is relatively increased. Thus, the face image which is the main subject has an improved texture, and an appropriate texture can be obtained.

As described above, in the image processing apparatus 100A shown in FIG. 9, the gain control signal CN3 of the addition-subtraction amplifier 103 is basically generated in the gain controller 108 on the basis of the information Iarf about the face image region obtained in the face detecting section 105. For this reason, in the face image region where the face image exists, the gain of the addition-subtraction amplifier 103 is controlled at a relatively low or high level with respect to other regions. Accordingly, regardless of the level of the overall texture due to the basic gain setting of the addition-subtraction amplifier 103, it is possible to obtain an appropriate texture for the face image.

Further, in the image processing apparatus 100A shown in FIG. 9, the image information Ifa about the face image is extracted in the face information extracting section 111, on the basis of the information Iarf about the face image region obtained in the face detecting section 105. Further, in the mask region creating section 113, the image region in which the image corresponding to the image information Ifa about the face image exists is detected as the re-configured image region, and the mask region signal Smsk is created on the basis of the information about the re-configured image region.

Figure 11A:
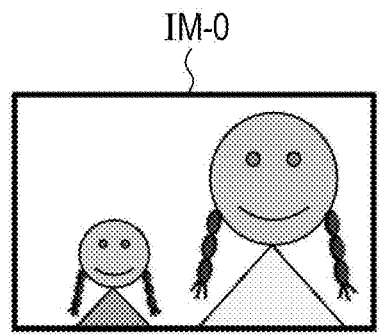
FIGS. 11A, 11B and 11C are diagrams illustrating that an image region in which an image corresponding to image information about a face image exists is detected as a re-configured image region.
Figure 11B:
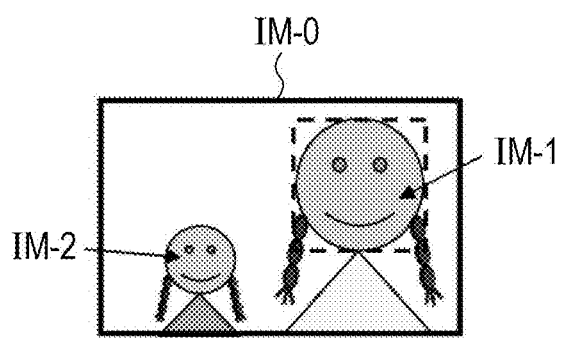
Figure 11C:
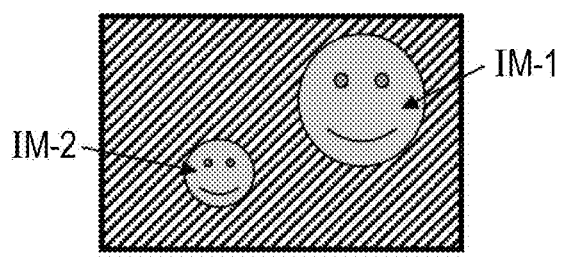

The re-configured image region includes a face image region in which a face image which is not detected in the face detecting section 105 exists. For example, a frame image IM-0 as shown in FIG. 11A will be described as an example. For example, as indicated by a dashed line frame shown in FIG. 11B, the face detecting section 105 detects a face image IM-1 of a large face included in the frame image IM-0, and does not detects a face image IM-2 of a small face included in the frame image IM-0. However, the re-configured image region detected on the basis of the image information Ifa about the face image includes a region of the face image IM-2 in addition to the region of the face image IM-1, as shown in FIG. 11C. Further, in FIG. 11C, the hatched region represents a region other than the re-configured image region.

In this way, the re-configured image region also includes the face image region where the face image which is not detected in the face detecting section 105 exists. For this reason, it is possible to enable all the face image regions to be included in the re-configured image region, even in a case where there is a false negative of the face image region in a laterally-facing face image or the like in the face detecting section 105. Accordingly, even in the case of the false negative of the face image region in the face detecting section 105, it is possible to appropriately control the gain of the addition-subtraction amplifier 103 in correspondence to all the face image regions included in the input image, to thereby obtain an appropriate texture for all the face images included in the image.

Further, in the image processing apparatus 100A shown in FIG. 9, the re-configured image region is detected from the input luminance data Yin and the input color data Cin on the basis of the image information Ifa about the face image extracted in the face information extracting section 111, in the mask region creating section 113. For this reason, even in a case where several frames are necessary for the detection of the face detecting section 105, the re-configured image region includes a face image region in which a face image exists in a current frame of the input image data Vin.

Accordingly, in the image processing apparatus 100A shown in FIG. 9, even in a case where the input image data Vin is moving image data and the face image region is moving, the gain of the addition-subtraction amplifier 103 can be appropriately controlled in correspondence to all the face image regions included in the input image. Thus, it is possible to obtain an appropriate texture for all the face images included in the input image.

Further, in the image processing apparatus 100A shown in FIG. 9, the image information Ifa about the face image extracted in the face information extracting section 111 is retained in the face information retaining section 112. Further, the mask region creating section 113 detects the re-configured image region on the basis of the image information Ifa about the face image retained in the face information retaining section 112, and creates the mask region signal Smsk on the basis of the information about the re-configured image region.

For this reason, since the face image information is retained in the face information retaining section 112 even in the case of a frame in which the face image region is not detected in the face detecting section 105, the mask region creating section 113 can stably detect the re-configured image region. Accordingly, even in the case of the frame in which the face image region is not detected in the face detecting section 105, the gain of the addition-subtraction amplifier 103 can be appropriately controlled in correspondence to all the face image regions included in the input image, and thus making it possible to obtain an appropriate texture for the all face images included in the input image.

Further, in the image processing apparatus 100A shown in FIG. 9, the face information retaining section 112 updates the retaining contents of the image information Ifa about the face image extracted in the face information extracting section 111 whenever the scene change is detected. For this reason, it is possible to decrease the updating frequency and to significantly lessen the CPU processing load.

In addition, in the image processing apparatus 100A shown in FIG. 9, the mask region signal Smsk created in the mask region creating section 113 is input to the space filter 107, which then performs the low pass filter process for the mask region signal Smsk in the horizontal direction and the vertical direction. Through this process, the portion of the mask region signal Smsk of which the level is rapidly changed in the horizontal direction and the vertical direction is smoothly changed. Thus, the gain control signal CN3 generated in the gain controller 108 is not rapidly changed in a boundary between the re-configured face image region and the other regions, and thus the boundary can be prevented from standing out.

In the image processing apparatus 100A shown in FIG. 9, the face detecting section 105 detects the face image for each frame. However, in the image processing apparatus 100A shown in FIG. 9, the image information Ifa about the face image extracted in the face information extracting section 111 is sent to and retained in the face information retaining section 112, and is used for the frame in which the face image region is not detected in the face detecting section 105. Thus, the face detecting section 105 may not necessarily detect the face image for each frame, and may detect the face image for every two or more frames.

Third Embodiment

Configuration of Image Processing Apparatus

Figure 12:
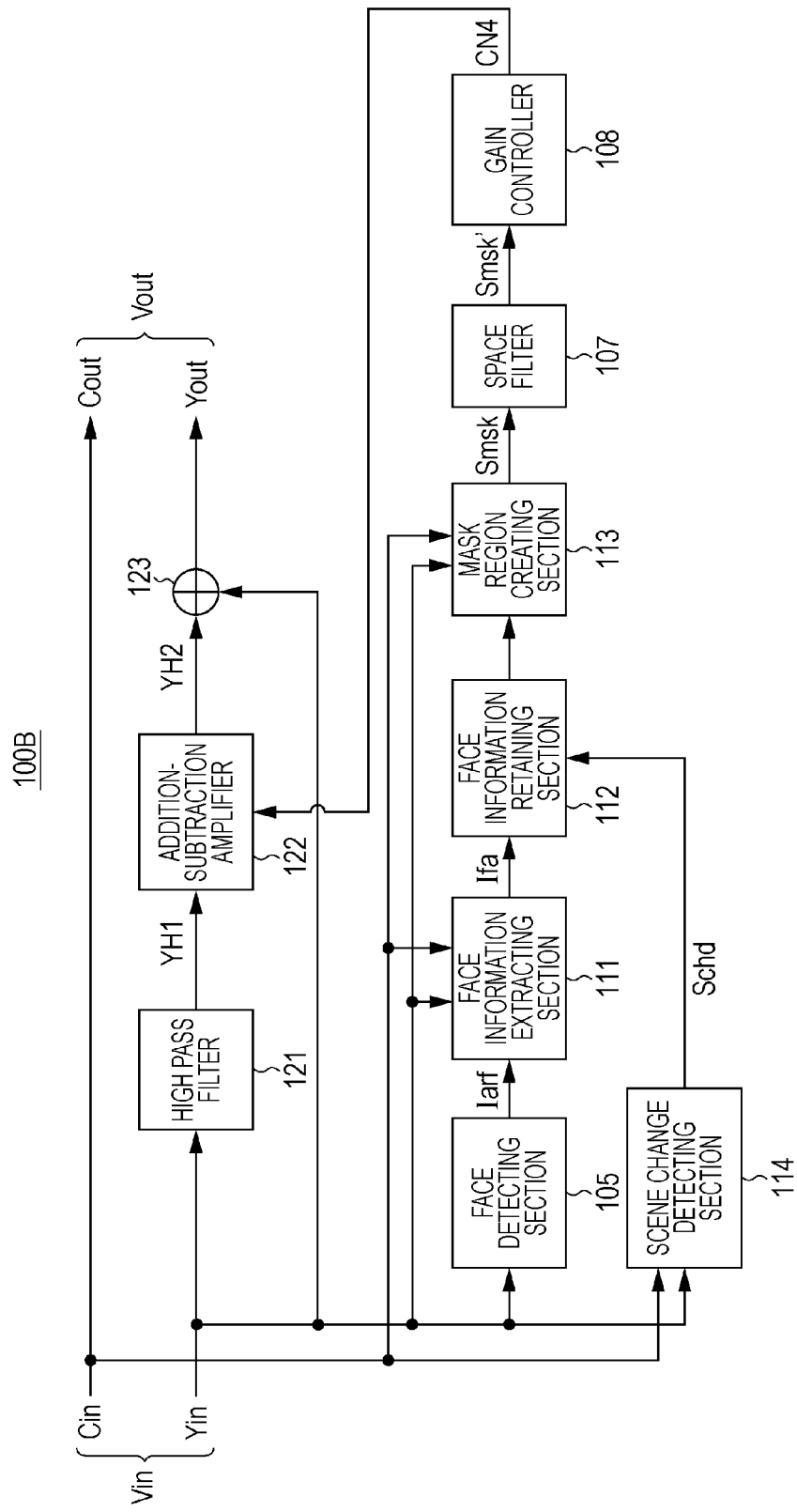
FIG. 12 is a diagram illustrating a configuration example of an image processing apparatus according to a third embodiment of the present invention.

FIG. 12 is a diagram illustrating a configuration example of an image processing apparatus 100B according to a third embodiment. In FIG. 12, elements corresponding to those in FIG. 9 are given the same reference numerals. The image processing apparatus 100B includes a high pass filter 121, an addition-subtraction amplifier 122, and an adder 123. Further, the image processing apparatus 100B includes a face detecting section 105, a face information extracting section 111, a face information retaining section 112, a mask region creating section 113, a space filter 107, a gain controller 108, and a scene change detecting section 114.

In the image processing apparatus 100B, the face detecting section 105, the face information extracting section 111, the face information retaining section 112, the mask region creating section 113, the space filter 107, the gain controller 108 and the scene change detecting section 114 are the same as in the image processing apparatus 100A shown in FIG. 9. Thus, detailed description thereof will be omitted.

The high pass filter 121 extracts a high frequency component YH1 from input luminance data Yin for forming input image data Vin. The addition-subtraction amplifier 122 amplifies the high frequency component YH1 obtained in the high pass filter 121 to obtain an amplified high frequency component YH2 as output data. The adder 123 adds the high frequency component YH2 obtained in the addition-subtraction amplifier 122 to the input luminance data Yin to obtain output luminance data Yout.

The gain controller 108 generates a gain control signal CN4 corresponding to a mask region signal Smsk' after filtering obtained in the space filter 107 and supplies the gain control signal CN4 to the addition-subtraction amplifier 122. In this case, the gain of the addition-subtraction amplifier 122 is a value proportional to the level of the gain control signal CN4. The gain of the addition-subtraction amplifier 122 is basically determined by a soft focus effect adjustment manipulation of a user, but the gain is further controlled by the gain control signal CN4.

For example, the gain controller 108 generates the gain control signal CN4 so that the gain of the addition-subtraction amplifier 122 is relatively decreased in the face image region in a case where the gain of the addition-subtraction amplifier 122 is set at a high level by the soft focus effect adjustment. In this case, the soft focus effect is increased as a whole, but since the gain of the addition-subtraction amplifier 122 is relatively suppressed in the face image region, it is possible to obtain an appropriate soft focus effect without a feeling of strangeness.

Further, for example, the gain controller 108 generates the gain control signal CN4 so that the gain of the addition-subtraction amplifier 122 is relatively increased in the face image region in a case where the gain of the addition-subtraction amplifier 122 is set at a low level by the soft focus effect adjustment. In this case, the soft focus effect is relatively suppressed as a whole, but since the gain of the addition-subtraction amplifier 122 is relatively increased in the face image region, the soft focus effect is enhanced. The other configuration of the image processing apparatus 100B shown in FIG. 12 is the same as in the image processing apparatus 100A shown in FIG. 9.

An operation of the image processing apparatus 100B shown in FIG. 12 will be described. The input luminance data Yin for forming the input image data Vin is supplied to the high pass filter 121. The high pass filter 121 extracts the high frequency component YH1 from the input luminance data Yin for forming the input image data Vin. The high frequency component YH1 extracted in the high pass filter 121 is supplied to the addition-subtraction amplifier 122. The addition-subtraction amplifier 122 amplifies the high frequency component YH1 to obtain an amplified high frequency component YH2 as output data. The basic gain of the addition-subtraction amplifier 122 is determined according to the soft focus effect adjustment manipulation of the user, as described above, for example.

The high frequency component YH2 obtained in the addition-subtraction amplifier 122 is supplied to the adder 123. The input luminance data Yin is also supplied to the adder 123. The adder 123 adds the high frequency component YH2 to the input luminance data Yin to obtain the output luminance data Yout for forming the output image data Vout. Input color data (red color difference data and blue color difference data) Cin for forming the input image data Vin becomes output color data Cout for forming the output image data Vout without change.

Further, the face detecting section 105 detects the face image on the basis of the input luminance data Yin to obtain the information Iarf about the face image region. The face information extracting section 111 extracts image information If about the face image from the input luminance data Yin and the input color data Cin, on the basis of the information Iarf about the face image region. The mask region creating section 113 detects the image region in which an image corresponding to the image information Ifa about the face image exists as a re-configured image region, and creates a mask region signal Smsk on the basis of the information about the re-configured image region. Further, the mask region signal Smsk undergoes a low pass filter process in the space filter 107, and then is supplied to the gain controller 108.

The gain controller 108 generates the gain control signal CN4 corresponding to the mask region signal Smsk', and supplies the gain control signal CN4 to the addition-subtraction amplifier 122. In this case, the gain of the addition-subtraction amplifier 122 becomes a value proportional to the level of the gain control signal CN4.

For example, the gain controller 108 generates the gain control signal CN4 so that the gain of the addition-subtraction amplifier 122 is relatively decreased in the face image region, in a case where the gain of the addition-subtraction amplifier 122 is set at a high level by the soft focus effect adjustment. In this case, the soft focus effect is increased as a whole, but since the gain of the addition-subtraction amplifier 122 is relatively suppressed in the face image region, it is possible to obtain an appropriate soft focus effect without inducing a feeling of strangeness.

Further, for example, the gain controller 108 generates the gain control signal CN4 so that the gain of the addition-subtraction amplifier 122 is relatively increased in the face image region, in a case where the gain of the addition-subtraction amplifier 122 is set at a low level by the soft focus effect adjustment. In this case, the soft focus effect is relatively suppressed as a whole, but since the gain of the addition-subtraction amplifier 122 is relatively increased in the face image region, the soft focus effect is enhanced.

As described above, in the image processing apparatus 100B shown in FIG. 12, the gain control signal CN4 of the addition-subtraction amplifier 122 is basically generated in the gain controller 108 on the basis of the information Iarf about the face image region obtained in the face detecting section 105. For this reason, in the face image region where the face image exists, the gain of the addition-subtraction amplifier 122 is controlled at a relatively low or high level with respect to other regions. Accordingly, regardless of the level of the overall soft focus effect due to the basic gain setting of the addition-subtraction amplifier 122, it is possible to obtain an appropriate soft focus effect for the face image.

Further, in the image processing apparatus 100B shown in FIG. 12, the image information Ifa about the face image is extracted in the face information extracting section 111, on the basis of the information Iarf about the face image region obtained in the face detecting section 105. Further, the mask region creating section 113 detects the image region in which the image corresponding to the image information Ifa about the face image exists as the re-configured image region, and creates the mask region signal Smsk on the basis of the information about the re-configured image region.

Thus, the face detecting section 105 can include all the face image regions in the re-configured image region, even in a case where there is a false negative of the face image region in a laterally-facing face image or the like. Accordingly, even in the case of the false negative of the face image region in the face detecting section 105, it is possible to appropriately control the gain of the addition-subtraction amplifier 122 in correspondence to all the face image regions included in the input image, to thereby obtain an appropriate soft focus effect for all the face images included in the image.

Further, in the image processing apparatus 100B shown in FIG. 12, the mask region creating section 113 detects the re-configured image region from the input luminance data Yin and the input color data Cin, on the basis of the image information Ifa about the face image extracted in the face information extracting section 111. For this reason, even in a case where several frames are necessary for the detection of the face detecting section 105, the re-configured image region includes a face image region in which a face image exists in a current frame of the input image data Vin.

Accordingly, in the image processing apparatus 100B shown in FIG. 12, even in a case where the input image data Vin is moving image data and the face image region is moving, the gain of the addition-subtraction amplifier 122 can be appropriately controlled in correspondence to all the face image regions included in the input image. Thus, it is possible to obtain an appropriate soft focus effect for all the face images included in the input image.

Further, in the image processing apparatus 100B shown in FIG. 12, it is possible to achieve the effect due to the face information retaining section 112 and the space filter 107, the effect achieved by performing the updating of the retaining information about the face information retaining section 112 for every scene change, and the like, in a similar way to the image processing apparatus 100A shown in FIG. 9.

Fourth Embodiment

Configuration of Image Processing Apparatus

Figure 13:
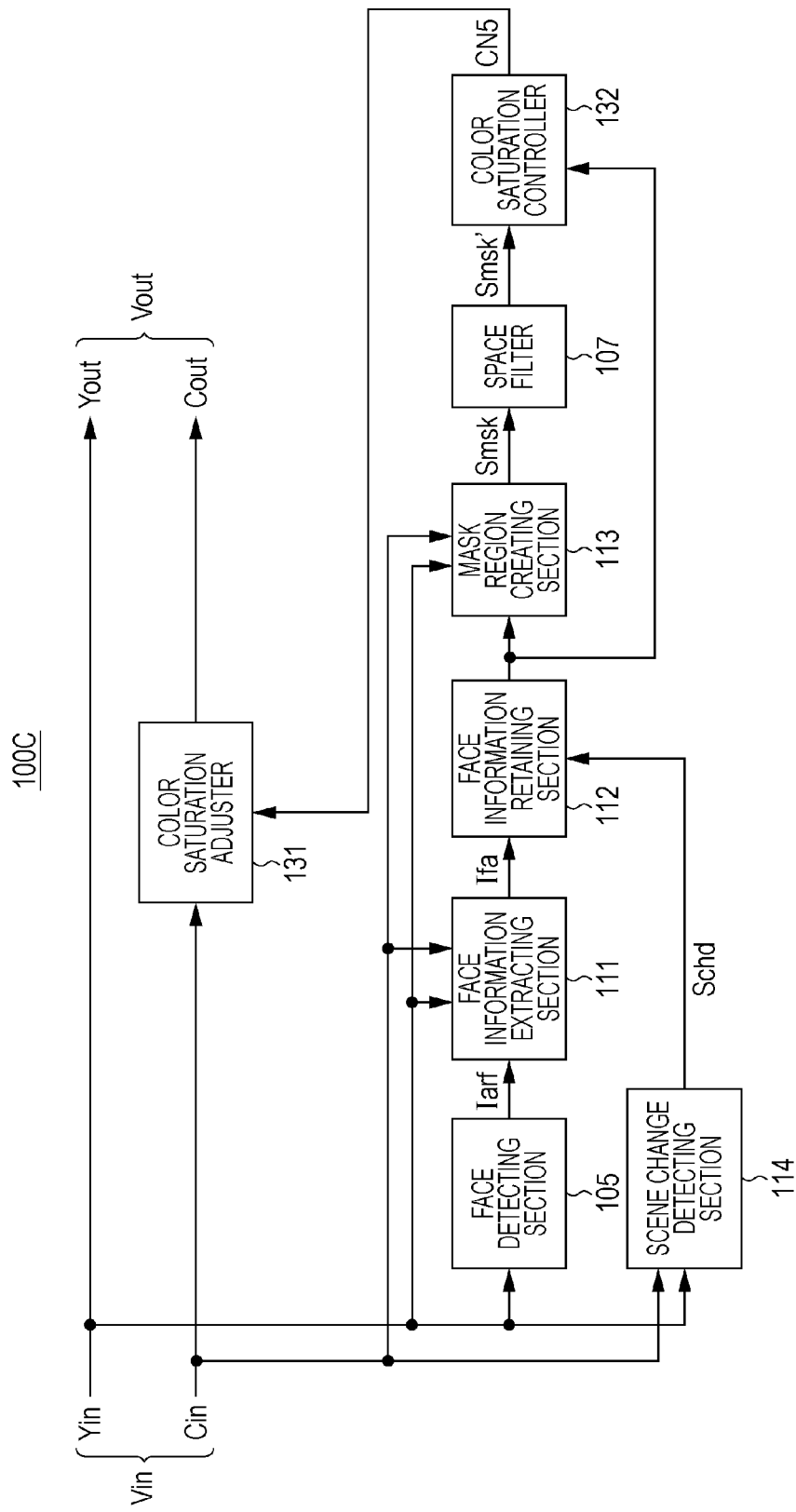
FIG. 13 is a diagram illustrating a configuration example of an image processing apparatus according to a fourth embodiment of the present invention.

FIG. 13 is a diagram illustrating a configuration example of an image processing apparatus 100C according to a fourth embodiment. In FIG. 13, elements corresponding to those in FIG. 9 are given the same reference numerals. The image processing apparatus 100C includes a color saturation adjuster 131 and a color saturation controller 132. Further, the image processing apparatus 100C includes a face detecting section 105, a face information extracting section 111, a face information retaining section 112, a mask region creating section 113, a space filter 107, and a scene change detecting section 114.

In the image processing apparatus 100C, the face detecting section 105, the face information extracting section 111, the face information retaining section 112, a mask region creating section 113, the space filter 107 and the scene change detecting section 114 are the same as in the image processing apparatus 100A shown in FIG. 9. Thus, detailed description thereof will be omitted.

The color saturation adjuster 131 performs a color saturation adjustment process for input color data (red color difference data and blue color difference data) Cin for forming input image data Vin. For example, the color saturation adjuster 131 is provided with an addition-subtraction amplifier for amplifying the red color difference data and the blue color difference data within the input color data Cin and performs the color saturation adjustment by adjusting the gain thereof. The color saturation adjustment process of the color saturation adjuster 131 is controlled by a color saturation control signal CN5 generated in the color saturation controller 132.

The color saturation controller 132 generates the color saturation control signal CN5 using color saturation information (two-dimensional UV histogram), from among the image information Ifa about a face image which is extracted by the face information extracting section 111 and is retained in the face information retaining section 112. Further, the color saturation controller 132 generates the color saturation control signal CN5 on the basis of a mask region signal Smsk' after filtering obtained in the space filter 107. The color saturation controller 132 generates the color saturation control signal CN5 for enabling the color saturation adjuster 131 to perform the color saturation adjustment processing so that the color saturation of the face image becomes a predetermined level of color saturation, and to perform the color saturation adjustment processing only in a re-configured face image region. Here, the predetermined level of color saturation is a fixed value or a user set value. The other configuration of the image processing apparatus 100C shown in FIG. 13 is the same as in the image processing apparatus 100A shown in FIG. 9.

An operation of the image processing apparatus 100C shown in FIG. 13 will be described. The input color data Cin for forming the input image data Vin is supplied to the color saturation adjuster 131. The color saturation adjustment process of the color saturation adjuster 131 is controlled by the color saturation control signal CN5 supplied from the color saturation controller 132. As described above, the color saturation control signal CN5 enables the color saturation adjustment processing so that the color saturation of the face image becomes the predetermined level of color saturation, and enables the color saturation adjustment processing only in the re-configured face image region.

For this reason, the color saturation adjuster 131 performs the color saturation adjustment processing so that the color saturation of the face image becomes the predetermined level of color saturation only in the re-configured face image region. The output color data (red color difference data and blue color difference data) of the color saturation adjuster 131 becomes output color data Cout for forming output image data Vout. Further, input luminance data Yin for forming input image data Vin becomes output luminance data Yout for forming the output image data Vout without change.

As described above, in the image processing apparatus 100C shown in FIG. 13, the image information Ifa about the face image is extracted in the face information extracting section 111, on the basis of information Iarf about the face image region obtained in the face detecting section 105. Further, the color saturation control signal CN5 is generated by using color saturation information (two-dimensional UV histogram), from among the image information Ifa about the face image. Thus, the color saturation adjustment of high accuracy can be performed in the face image region so that the color saturation of the face image becomes the predetermined level of color saturation.

Further, in the image processing apparatus 100C shown in FIG. 13, when the color saturation control signal CN5 is generated in the color saturation controller 132, the image information Ifa about the face image retained in the face information retaining section 112 is used. For this reason, even in the case of a frame in which the face image region is not detected in the face detecting section 105, the color saturation controller 132 stably generates the color saturation control signal CN5, and thus the color saturation adjustment can be stably performed.

In addition, in the image processing apparatus 100C shown in FIG. 13, it is possible to achieve the effect due to the space filter 107, the effect achieved by performing updating of the retaining information in the face information retaining section 112 for every scene change, or the like, in a similar way to the image processing apparatus 100A shown in FIG. 9.

Fifth Embodiment

Configuration of Image Processing Apparatus

Figure 14:
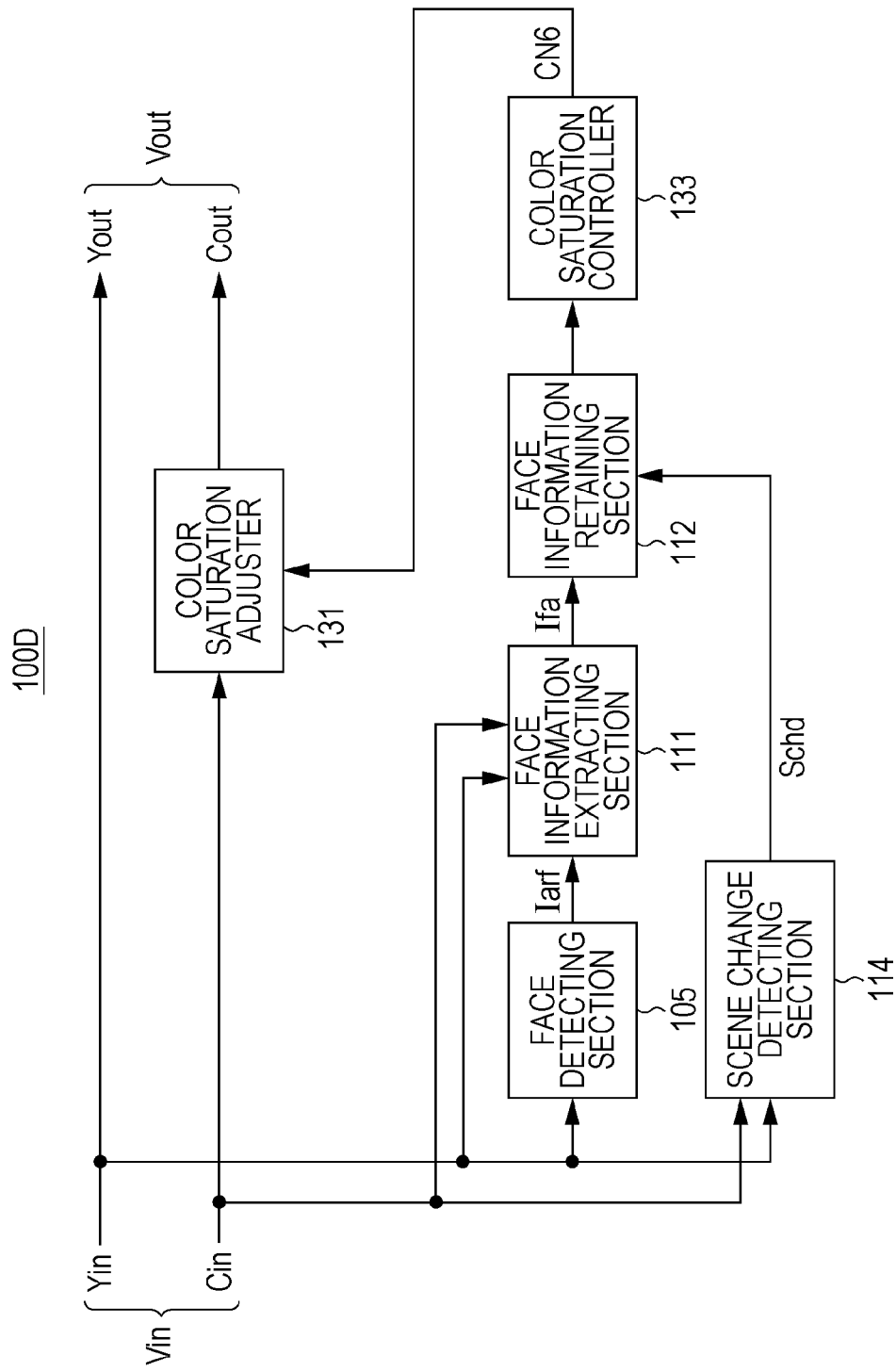
FIG. 14 is a diagram illustrating a configuration example of an image processing apparatus according to a fifth embodiment of the present invention.

FIG. 14 is a diagram illustrating a configuration example of an image processing apparatus 100D according to a fifth embodiment. In FIG. 14, elements corresponding to those in FIGS. 9 and 13 are given the same reference numerals. The image processing apparatus 100D includes a color saturation adjuster 131 and a color saturation controller 133. Further, the image processing apparatus 100D includes a face detecting section 105, a face information extracting section 111, a face information retaining section 112, and a scene change detecting section 114.

In the image processing apparatus 100D, the color saturation adjuster 131, the face detecting section 105, the face information extracting section 111, the face information retaining section 112 and the scene change detecting section 114 are the same as in the image processing apparatus 100C shown in FIG. 13. Thus, detailed description thereof will be omitted.

The color saturation adjustment process of the color saturation adjuster 131 is controlled by a color saturation control signal CN6 generated in the color saturation controller 133. The color saturation controller 133 generates the color saturation control signal CN6 using color saturation information (two-dimensional UV histogram) from among the image information Ifa about the face image which is extracted in the face information extracting section 111 and is retained in the face information retaining section 112. The color saturation controller 133 generates the color saturation control signal CN6 for enabling the color saturation adjuster 131 to perform the color saturation adjustment processing so that the color saturation of the face image becomes a predetermined level of color saturation. The other configuration of the image processing apparatus 100D shown in FIG. 14 is the same as in the image processing apparatus 100A shown in FIGS. 9 and 13.

An operation of the image processing apparatus 100D shown in FIG. 14 will be described. Input color data Cin for forming input image data Vin is supplied to the color saturation adjuster 131. The color saturation adjustment process of the color saturation adjuster 131 is controlled by the color saturation control signal CN6 from the color saturation controller 133. As described above, the color saturation control signal CN6 enables the color saturation adjustment processing so that the color saturation of the face image becomes the predetermined level of color saturation.

For this reason, the color saturation adjuster 131 performs the color saturation adjustment process in an overall screen so that the color saturation of the face image becomes the predetermined level of color saturation. Output color data (red color difference data and blue color difference data) of the color saturation adjuster 131 becomes output color data Cout for forming output image data Vout. Further, input luminance data Yin for forming input image data Vin becomes output luminance data Yout for forming the output image data Vout without change.

As described above, in the image processing apparatus 100D shown in FIG. 14, the image information Ifa about the face image is extracted in the face information extracting section 111, on the basis of information Iarf about the face image region obtained in the face detecting section 105. Further, the color saturation control signal CN6 is generated by using the color saturation information (two-dimensional UV histogram) from among the image information Ifa about the face image. Thus, the color saturation of the overall screen can be adjusted so that the color saturation of the face image becomes the predetermined level of color saturation. In the image processing apparatus 100D, since a visual characteristic of human beings is being highly sensitive to faces, it is possible to simply process the color saturation of the entire screen through the change in the color saturation histogram of the face image region, so as to achieve a high picture quality.

Further, in the image processing apparatus 100D shown in FIG. 14, when the color saturation control signal CN6 is generated in the color saturation controller 133, the image information Ifa about the face image retained in the face information retaining section 112 is used. For this reason, even in the case of a frame in which the face image region is not detected in the face detecting section 105, the color saturation controller 133 stably generates the color saturation control signal CN6, and the color saturation adjustment can be stably performed. In addition, in the image processing apparatus 100D shown in FIG. 14, it is possible to achieve the effect achieved by performing the updating of the retaining information about the face information retaining section 112 for every scene change, or the like, in a similar way to the image processing apparatus 100A shown in FIG. 9.

Sixth Embodiment

Configuration of Image Processing Apparatus

Figure 15:
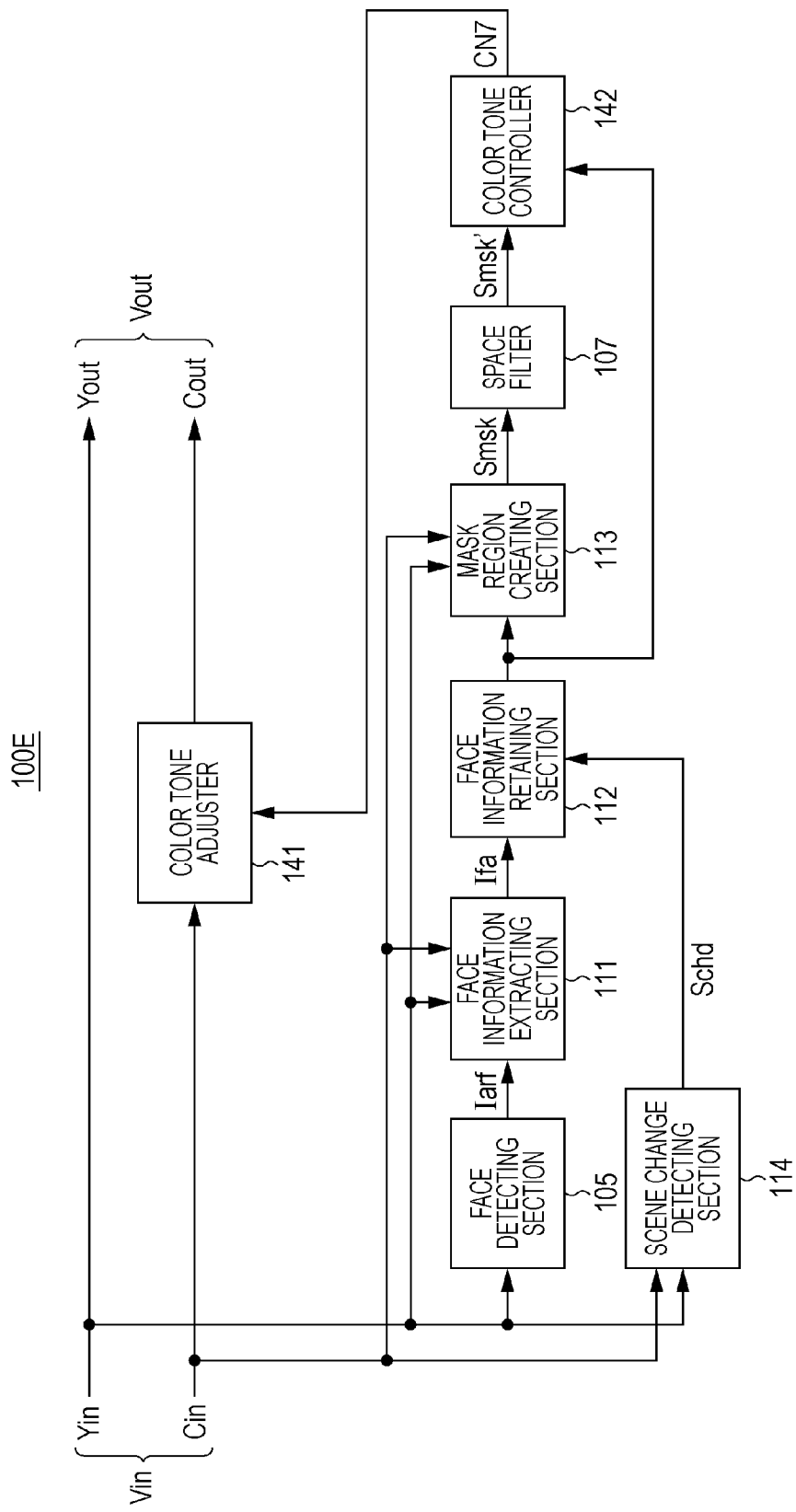
FIG. 15 is a diagram illustrating a configuration example of an image processing apparatus according to a sixth embodiment of the present invention.

FIG. 15 is a diagram illustrating a configuration example of an image processing apparatus 100E according to a sixth embodiment. In FIG. 15, elements corresponding to those in FIG. 9 are given the same reference numerals. The image processing apparatus 100E includes a color tone adjuster 141 and a color tone controller 142. Further, the image processing apparatus 100E includes a face detecting section 105, a face information extracting section 111, a face information retaining section 112, a mask region creating section 113, a space filter 107 and a scene change detecting section 114.

In the image processing apparatus 100E, the face detecting section 105, the face information extracting section 111, the face information retaining section 112, the mask region creating section 113, the space filter 107 and the scene change detecting section 114 are the same as in the image processing apparatus 100A shown in FIG. 9. Thus, detailed description thereof will be omitted.

The color tone adjuster 141 performs a color tone adjustment process for input color data (red color difference data and blue color difference data) Cin for forming input image data Vin. For example, the color tone adjuster 141 is provided with two addition-subtraction amplifiers which respectively amplify the red color difference data and the blue color difference data in the input color data Cin, and the color tone adjustment is performed by individually adjusting the gain of each addition-subtraction amplifier. The color tone adjustment process of the color tone adjuster 141 is controlled by a color tone control signal CN7 generated in the color tone controller 142.

The color tone controller 142 generates the color tone control signal CN7 using color tone information (two-dimensional UV histogram), from among the image information Ifa about a face image which is extracted in the face information extracting section 111 and is retained in the face information retaining section 112. Further, the color tone controller 142 generates the color tone control signal CN7 on the basis of a mask region signal Smsk' after filtering obtained in the space filter 107. The color tone controller 142 generates the color tone control signal CN7 for enabling the color tone adjuster 141 to perform the color tone adjustment processing so that the color tone of the face image becomes a predetermined level of color tone, and to perform the color tone adjustment processing only in a re-configured face image region. The predetermined color tone is a fixed value or a user set value. The other configuration of the image processing apparatus 100E shown in FIG. 15 is the same as in the image processing apparatus 100A shown in FIG. 9.

An operation of the image processing apparatus 100E shown in FIG. 15 will be described. The input color data Cin for forming input image data Vin is supplied to the color tone adjuster 141. The color tone adjustment process of the color tone adjuster 141 is controlled by the color tone control signal CN7 supplied from the color tone controller 142. As described above, the color control signal CN7 enables the color tone adjustment processing so that the color tone of the face image becomes the predetermined level of color tone, and enables the color tone adjustment processing only in the re-configured face image region.

For this reason, the color tone adjuster 141 performs the color tone adjustment processing so that the color tone of the face image becomes the predetermined level of color tone only in the re-configured face image region. Output color data (red color difference data and blue color difference data) of the color tone adjuster 141 becomes output color data Cout for forming output image data Vout. Input luminance data Yin for forming the input image data Vin becomes output luminance data Yout for forming the output image data Vout without change.

As described above, in the image processing apparatus 100E shown in FIG. 15, the image information Ifa about the face image is extracted in the face information extracting section 111, on the basis of the information Iarf about the face image region obtained in the face detecting section 105. Further, the color tone control signal CN7 is generated by using the color tone information (two-dimensional UV histogram) from among the image information Ifa about the face image. For this reason, the color tone adjustment of high accuracy can be performed in the face image region so that the color tone of the face image becomes the predetermined level of color tone.

Further, in the image processing apparatus 100E shown in FIG. 15, when the color tone control signal CN7 is generated in the color tone controller 142, the image information Ifa about the face image retained in the face information retaining section 112 is used. For this reason, even in the case of a frame in which the face image region is not detected in the face detecting section 105, the color tone controller 142 stably generates the color tone control signal CN7, and the color tone adjustment can be stably performed.

In addition, in the image processing apparatus 100E shown in FIG. 15, it is possible to achieve the effect due to the space filter 107, the effect achieved by performing the updating of the retaining information about the face information retaining section 112 for each scene change, or the like, in a similar way to the image processing apparatus 100A shown in FIG. 9.

Seventh Embodiment

Configuration of Image Processing Apparatus

Figure 16:
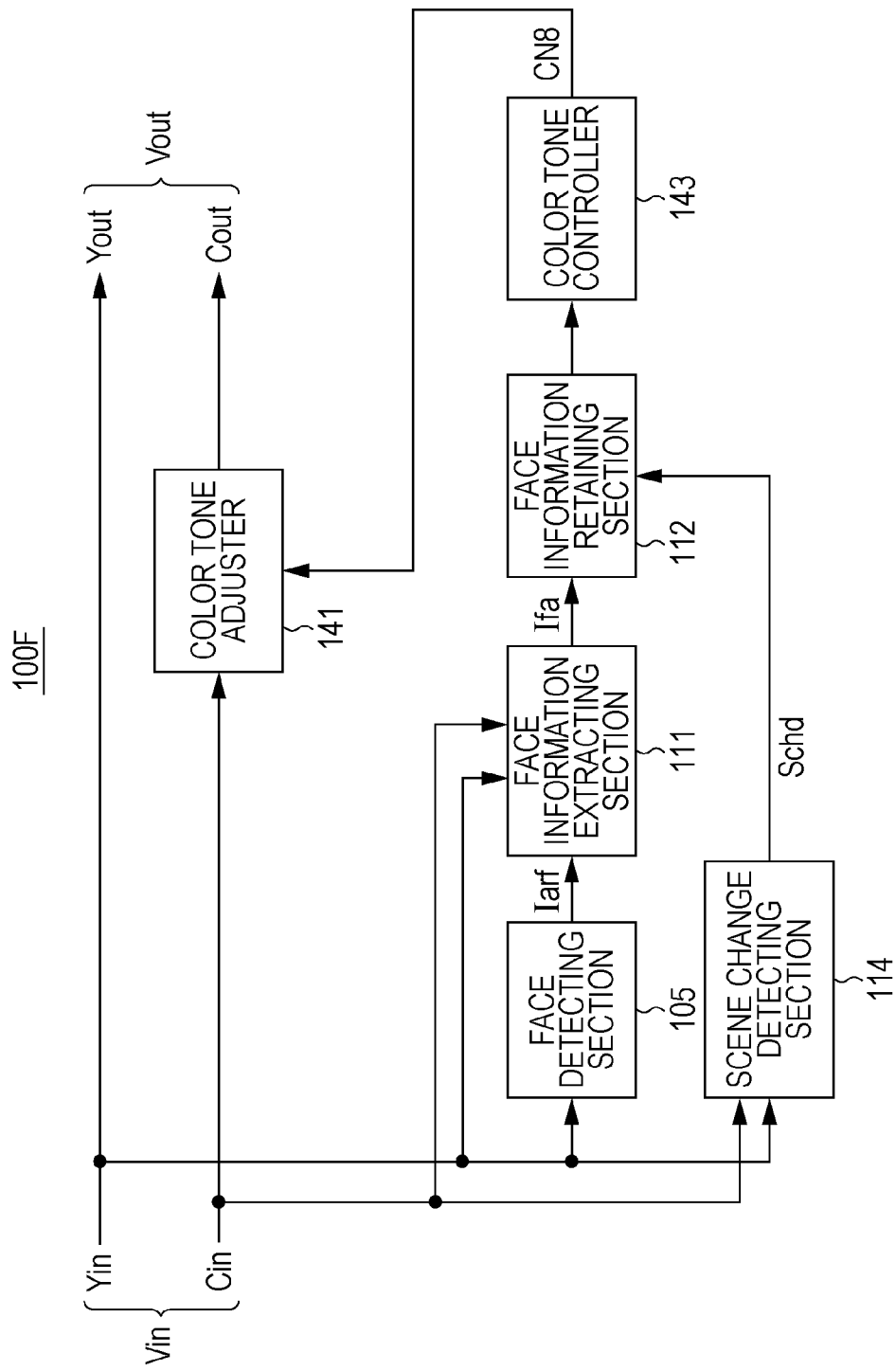
FIG. 16 is a diagram illustrating a configuration example of an image processing apparatus according to a seventh embodiment of the present invention.

FIG. 16 is a diagram illustrating a configuration of an image processing apparatus 100F according to a seventh embodiment. In FIG. 16, elements corresponding to those in FIGS. 9 and 15 are given the same reference numerals. The image processing apparatus 100F includes a color tone adjuster 141 and a color tone controller 143. Further, the image processing apparatus 100F includes a face detecting section 105, a face information extracting section 111, a face information retaining section 112, and a scene change detecting section 114.

In the image processing apparatus 100F, the color tone adjuster 141, the face detecting section 105, the face information extracting section 111, the face information retaining section 112 and the scene change detecting section 114 are the same as in the image processing apparatus 100E shown in FIGS. 9 and 15. Thus, detailed description thereof will be omitted.

The color tone adjustment process of the color tone adjuster 141 is controlled by a color tone control signal CN8 generated in the color tone controller 143. The color tone controller 143 generates a color tone control signal CN8 using color tone information (two-dimensional UV histogram), from among the image information Ifa about a face image which is extracted in the face information extracting section 111 and is retained in the face information retaining section 112. Further, the color tone controller 143 generates the color tone control signal CN8 for enabling the color tone adjuster 141 to perform the color tone processing so that the color tone of the face image becomes a predetermined level of color tone. The other configuration of the image processing apparatus 100F shown in FIG. 16 is the same as in the image processing apparatus 100A shown in FIGS. 9 and 15.

An operation of the image processing apparatus 100F shown in FIG. 16 will be described. Input color data Cin for forming input image data Vin is supplied to the color tone adjuster 141. The color tone adjustment process of the color tone adjuster 141 is controlled by the color tone control signal CN8 supplied from the color tone controller 143. As described above, the color tone control signal CN8 enables the color tone adjustment processing so that the color tone of the face image becomes the predetermined level of color tone.

For this reason, the color tone adjuster 141 performs the color tone adjustment process in an overall screen so that the color tone of the face image becomes the predetermined level of color tone. Output color data (red color difference data and blue color difference data) of the color tone adjuster 141 becomes output color data Cout for forming output image data Vout. Input luminance data Yin for forming the input image data Vin becomes output luminance data Yout for forming the output image data Vout without change.

As described above, in the image processing apparatus 100F shown in FIG. 16, the image information Ifa about the face image is extracted in the face information extracting section 111, on the basis of the information Iarf about the face image region obtained in the face detecting section 105. Further, the color tone control signal CN8 is generated by using the color tone information (two-dimensional UV histogram) from among the image information Ifa about the face image. For this reason, the color tone of the overall screen can be adjusted so that the color tone of the face image becomes the predetermined level of color tone. In the image processing apparatus 100F, since a visual characteristic of human beings is being highly sensitive to faces, it is possible to simply process the color tone of the entire screen through the change in the color tone histogram of the face image region, so as to achieve a high picture quality.

In addition, in the image processing apparatus 100F shown in FIG. 16, when the color tone control signal CN8 is generated in the color tone controller 143, the image information Ifa about the face image retained in the face information retaining section 112 is used. For this reason, even in the case of a frame in which the face image region is not detected in the face detecting section 105, the color tone controller 143 stably generates the color tone control signal CN8, and the color tone adjustment can be stably performed. Further, in the image processing apparatus 100F shown in FIG. 16, it is possible to achieve the effect achieved by performing the updating of the retaining information about the face information retaining section 112 for every scene change, or the like, in a similar way to the image processing apparatus 100A shown in FIG. 9.

Eighth Embodiment

Configuration of Image Processing Apparatus

Figure 17:
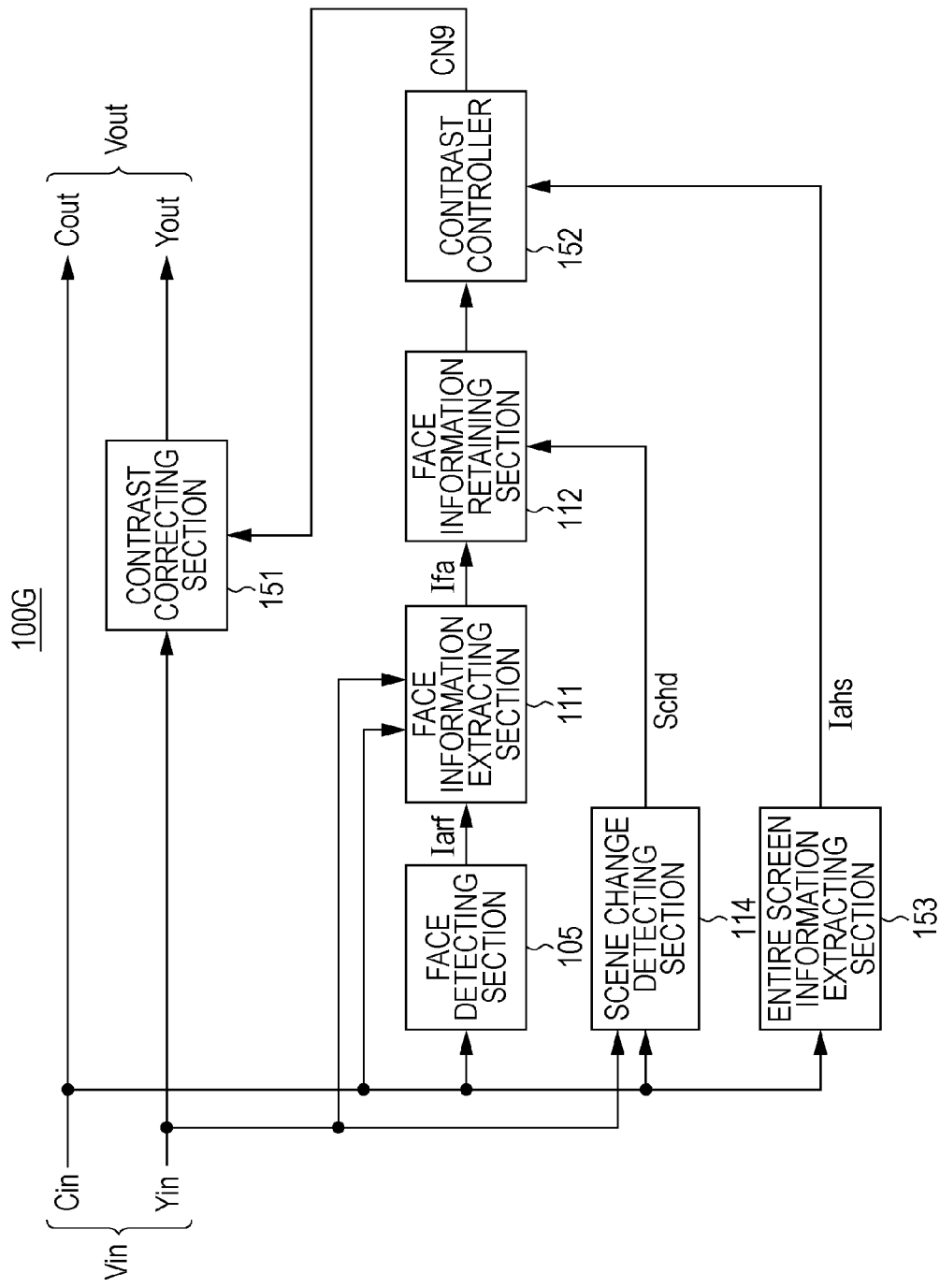
FIG. 17 is a diagram illustrating a configuration example of an image processing apparatus according to an eighth embodiment of the present invention.

FIG. 17 is a diagram illustrating a configuration of an image processing apparatus 100G according to an eighth embodiment. In FIG. 17, elements corresponding to those in FIG. 9 are given the same reference numerals. The image processing apparatus 100G includes a contrast correcting section 151, an entire screen information extracting section 153. Further, the image processing apparatus 100G includes a face detecting section 105, a face information extracting section 111, a face information retaining section 112, and a scene change detecting section 114.

In the image processing apparatus 100G, the face detecting section 105, the face information extracting section 111, the face information retaining section 112, and the scene change detecting section 114 are the same as in the image processing apparatus 100A shown in FIG. 9. Thus, detailed description thereof will be omitted.

The contrast correcting section 151 performs a contrast correction process with respect to input luminance data Yin for forming input image data Vin. The contrast correcting section 151 performs the contrast correction process by converting input luminance data Yin to output luminance data Yout, on the basis of an input and output characteristic curve (correction curve) CN9 generated in a contrast controller 152.

The entire screen information extracting section 153 creates a luminance histogram of the entire screen on the basis of the input luminance data Yin and sends its information Iahs to the contrast controller 152. The contrast controller 152 basically creates the input and output characteristic curve (correction curve) CN9 on the basis of the information Iahs of the luminance histogram of the entire screen supplied from the entire screen information extracting section 153.

For example, in a case where the frequency of a low luminance region (black level region) is high, the input and output characteristic curve CN9 is created so that the contrast of the low luminance region is broadened. Further, for example, in a case where the frequency of a high luminance region (white level region) is high, the input and output characteristic curve CN9 is created so that the contrast of the high luminance region is broadened. In addition, for example, in a case where the frequency of an intermediate luminance region is high, the input and output characteristic curve CN9 is created so that the contrast of the intermediate luminance region is broadened.

Further, the contrast controller 152 corrects the input and output characteristic curve CN9 using a luminance histogram from among the image information Ifa about the face image which is extracted in the face information extracting section 111 and is retained in the face information retaining section 112. In this case, the contrast controller 152 corrects the input and output characteristic curve CN9 so that an underexposure or overexposure is not generated in the face image region.

Figure 18A:
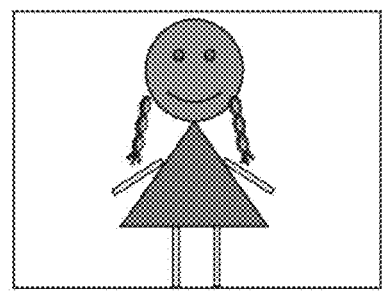
FIGS. 18A and 18C are diagrams illustrating an input and output characteristic curve (correction curve) for contrast correction, which is generated in a contrast controller.
Figure 18B:
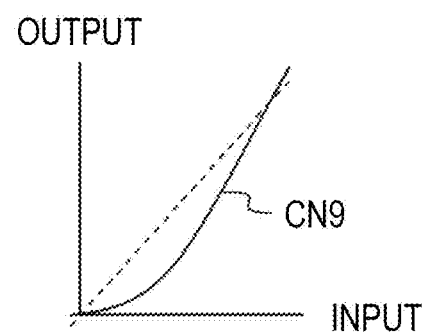
Figure 18C:
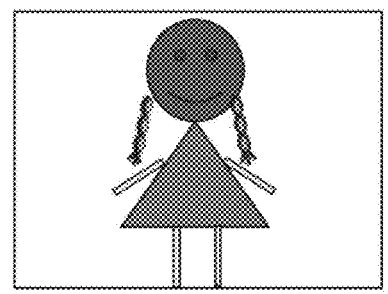

For example, in the case of a frame image as shown in FIG. 18A, the frequency of the high luminance region (white level region) becomes high in the luminance histogram of the entire screen. For this reason, in the contrast correcting section 151, as shown in FIG. 18B, the input and output characteristic curve CN9 is basically created so that the contrast of the high luminance region is broadened. However, in a case where the input and output characteristic curve CN9 is used without change, as shown in FIG. 18C, the underexposure is generated in a face image region in the low luminance region from the beginning.

Figure 19A:
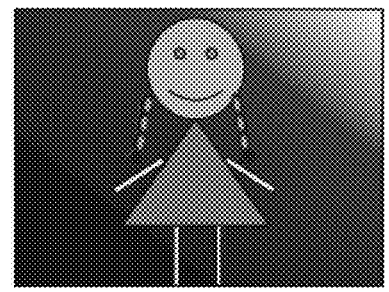
FIGS. 19A, 19B and 19C are diagrams illustrating another input and output characteristic curve (correction curve) for contrast correction, which is generated in a contrast controller.
Figure 19B:
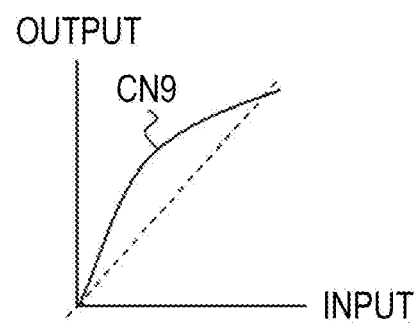
Figure 19C:
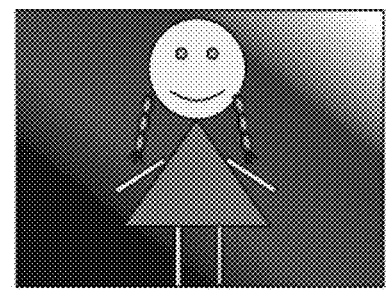

Further, for example, in the case of a frame image as shown in FIG. 19A, the frequency of the low luminance region (black level region) becomes high in the luminance histogram of the entire screen. For this reason, in the contrast correcting section 151, as shown in FIG. 19B, the input and output characteristic curve CN9 is basically created so that the contrast of the low luminance region is broadened. However, in a case where the input and output characteristic curve CN9 is used without change, as shown in FIG. 19C, the overexposure is generated in a face image region in the high luminance region from the beginning.

Figure 20A:
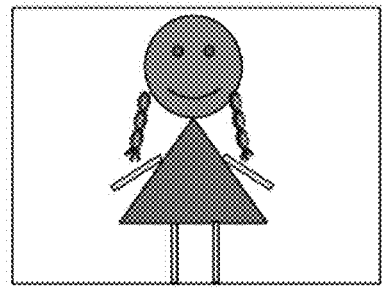
FIGS. 20A, 20B, 20C and 20D are diagrams illustrating still another input and output characteristic curve (correction curve) for contrast correction, which is generated in a contrast controller.
Figure 20B:
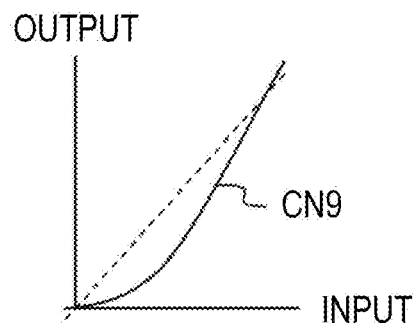
Figure 20C:
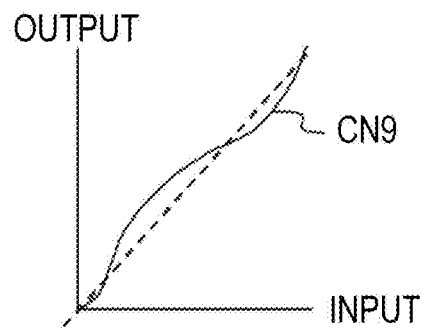
Figure 20D:
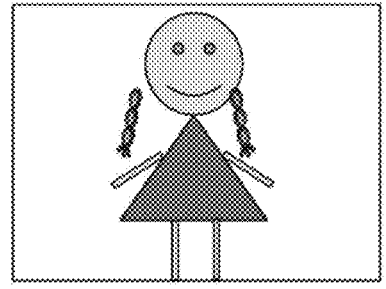

Further, for example, in a case where the input and output characteristic curve CN9 (which is the same as in FIG. 18B) as shown in FIG. 20B is basically created in a frame image (which is the same as in FIG. 18A) as shown in FIG. 20A, the following correction will be performed. That is, with respect to the input and output characteristic curve CN9 as shown in FIG. 20B, the input and output characteristic curve CN9 is corrected so that the contrast of the face image region in the low luminance region is broadened, as shown in FIG. 20C, on the basis of the luminance histogram of the face image. In a case where the corrected input and output characteristic curve CN9 is used, as shown in FIG. 20D, the underexposure is not generated in the face image region in the low luminance region.

Although not described, for example, even in the case where the input and output characteristic curve CN9 is basically created as shown in FIG. 19B, in the frame image as shown in FIG. 19A, the input and output characteristic curve CN9 is similarly corrected so that the contrast of the face image region in the high luminance region is broadened. The other configuration of the image processing apparatus 100G shown in FIG. 17 is the same as in the image processing apparatus 100A shown in FIG. 9.

An operation of the image processing apparatus 100G shown in FIG. 17 will be described. Input luminance data Yin for forming input image data Vin is supplied to the contrast correcting section 151. The contrast correction process in the contrast correcting section 151 is performed on the basis of the input and output characteristic curve (correction curve) CN9 supplied from the contrast correcting section 152.

Further, the input luminance data Yin is supplied to the entire screen information extracting section 153. The entire screen information extracting section 153 creates the luminance histogram of the entire screen on the basis of the input luminance data Yin, and then sends the information Iahs to the contrast controller 152. In addition, the information about the luminance histogram from among the image information Ifa about the face image which is extracted in the face information extracting section 111 and is retained in the face information retaining section 112 is sent to the contrast controller 152.

The contrast controller 152 basically creates the input and output characteristic curve (correction curve) CN9 on the basis of the information Iahs on the luminance histogram of the entire screen supplied from the entire screen information extracting section 153. Further, the contrast controller 152 corrects the input and output characteristic curve CN9 on the basis of the luminance histogram of the face image so that the contrast of the face image region is broadened. In addition, the input and output characteristic curve CN9 generated in the contrast controller 152 in this way is supplied to the contrast correcting section 151.

The output luminance data of the contrast correcting section 151 becomes output luminance data Yout for forming output image data Vout. Further, input color data Cin for forming the input image data Vin becomes output color data Cout for forming the output image data Vout without change.

As described above, in the image processing apparatus 100G shown in FIG. 17, the image information Ifa about the face image is extracted in the face information extracting section 111, on the basis of the information Iarf about the face image region obtained in the face detecting section 105. Further, the input and output characteristic curve CN9 generated in the contrast controller 152 is corrected so that the contrast of the face image region is broadened, on the basis of the luminance histogram from among the image information Ifa about the face image. Accordingly, it is possible to perform a preferable contrast correction.

Further, in the image processing apparatus 100G shown in FIG. 17, when the input and output characteristic curve CN9 is corrected in the contrast controller 152, the luminance histogram of the face image retained in the face information retaining section 112 is used. For this reason, even in the case of a frame in which the face image region is not detected in the face detecting section 105, the contrast controller 152 stably generates the input and output characteristic curve CN9, and thus, a stable contrast correction can be achieved. In addition, in the image processing apparatus 100G shown in FIG. 17, it is possible to achieve the effect achieved by performing the updating of the retaining information about the face information retaining section 112 for each scene change, or the like, in a similar way to the image processing apparatus 100A shown in FIG. 9.

Ninth Embodiment

Configuration of Image Processing Apparatus

FIG. 21 is a diagram illustrating a configuration of an image processing apparatus 100H according to a ninth embodiment. In FIG. 21, elements corresponding to those in FIGS. 9 and 17 are given the same reference numerals. The image processing apparatus 100H includes a non-linear filter 101, a subtractor 102, an addition-subtraction amplifier 103 and an adder 104. Further, the image processing apparatus 100H includes a face detecting section 105, a face information extracting section 111, a face information retaining section 112, a mask region creating section 113, a space filter 107, a gain controller 108, and a scene change detecting section 114. In addition, the image processing apparatus 100H includes a contrast correcting section 151, an entire screen information extracting section 153, and a controller 161.

In the image processing apparatus 100H, the non-linear filter 101, the subtractor 102, the addition-subtraction amplifier 103 and the adder 104 are the same as in the image processing apparatus 100A shown in FIG. 9. Thus, detailed description thereof will be omitted. Further, in the image processing apparatus 100H, the face detecting section 105, the face information extracting section 111, the face information retaining section 112, the mask region creating section 113, the space filter 107 and the scene change detecting section 114 are the same as in the image processing apparatus 100A shown in FIG. 9. In addition, in the image processing apparatus 100H, the contrast correcting section 151 and the entire screen information extracting section 153 are the same as in the image processing apparatus 100G shown in FIG. 17.

The contrast correcting section 151 performs a contrast correction process for a structure component ST1 generated in the non-linear filter 101. The contrast correcting section 151 performs the contrast correction process by converting a structure component ST1 into a structure component ST2, on the basis of an input and output characteristic curve (correction curve) CN9 generated in the controller 161.

The controller 161 generates a gain control signal CN3 corresponding to a mask region signal Smsk' after filtering obtained in the space filter 107 and supplies the gain control signal CN3 to the addition-subtraction amplifier 103. In this case, the gain of the addition-subtraction amplifier 103 becomes a value proportional to the level of the gain control signal CN3.

Further, the controller 161 basically creates the input and output characteristic curve (correction curve) CN9, on the basis of information Iahs on a luminance histogram of the entire screen supplied from the entire screen information extracting section 153. In addition, the controller 161 corrects the input and output characteristic curve CN9 such that the contrast of the face image region is broadened using the luminance histogram of the face image which is extracted in the face information extracting section 111 and is retained in the face information retaining section 112. The other configuration of the image processing apparatus 100H shown in FIG. 21 is the same as in the image processing apparatus 100A shown in FIG. 9 and as in the image processing apparatus 100G shown in FIG. 17.

An operation of the image processing apparatus 100H shown in FIG. 21 will be described. Input luminance data Yin for forming input image data Vin is supplied to the non-linear filter 101. The non-linear filter 101 smoothes the input luminance data Yin while keeping an edge and generates the structure component ST1 as the smoothed data.

Further, the input luminance data Yin is supplied to the subtractor 102. The structure component ST1 generated in the non-linear filter 101 is also supplied to the subtractor 102. The subtractor 102 subtracts the structure component ST1 from the input luminance data Yin to obtain a texture component TX1 which is output data.

The texture component TX1 obtained in the subtractor 102 is supplied to the addition-subtraction amplifier 103. The addition-subtraction amplifier 103 amplifies the texture component TX1 to obtain an amplified texture component TX2. The basic gain of the addition-subtraction amplifier 103 is determined, for example, according to a display mode selection manipulation of a user. The texture component TX2 obtained in the addition-subtraction amplifier 103 is supplied to the adder 104.

Further, the structure component ST1 generated in the non-linear filter 101 is supplied to the contrast correcting section 151. The contrast correcting section 151 performs the contrast correction process for the structure component ST1 on the basis of the input and output characteristic curve (correction curve) CN9 supplied from the controller 161. The structure component ST2 output from the contrast correcting section 151 is supplied to the adder 104.

The adder 104 adds the texture component TX2 to the structure component ST2 to obtain the output luminance data Yout for forming the output image data Vout. Further, the input color data (red color difference data and blue color difference data) Cin for forming the input image data Vin becomes the output color data Cout for forming the output image data Vout without change.

Further, the input luminance data Yin for forming the input image data Vin is supplied to the face detecting section 105. The face detecting section 105 detects the face image for each frame on the basis of the input luminance data Yin, and obtains information Iarf about the face image region where the face image exists, for example, face detection frame information (position information and size information). The information Iarf about the face image region is supplied to the face information extracting section 111.

The face information extracting section 111 extracts the image information Ifa of the face image from the input luminance data Yin and the input color data Cin, for each frame, on the basis of the information Iarf about the face image region obtained in the face detecting section 105. For example, the face image extracting section 111 measures the luminance histogram and two-dimensional UV histogram of the face image region as the face image information Ifa. In this way, the image information Ifa on the face image extracted in the face information extracting section 111 is supplied to the face information retaining section 112.

The face information retaining section 112 retains the image information Ifa about the face image supplied from the face information extracting section 111. In this case, the face information retaining section 112 updates the retaining contents of the image information Ifa about the face image extracted in the face information extracting section 111, whenever the scene change is detected on the basis of a scene change detection signal Schd from the scene change detecting section 114 whenever the image state is changed.

The mask region creating section 113 detects an image region in which an image corresponding to the image information Ifa about the face image retained in the face information retaining section 112 exists, for each frame, on the basis of the input luminance data Yin and the input color data Cin, as a re-configured image region. Further, the mask region creating section 113 creates a mask region signal Smsk, for example, which becomes a high level in the re-configured face image region and becomes a low level in other regions, on the basis of the information about the re-configured image region.

The mask region signal Smsk created in the mask region creating section 113 is input to the space filter 107, which then performs the low pass filter process for the mask region signal Smsk in the horizontal direction and the vertical direction. Through the process, a portion of the mask region signal Smsk of which the level is rapidly changed in the horizontal direction and the vertical direction is smoothly changed. The mask region signal Smsk' after filtering obtained in the space filter 107 is supplied to the controller 161.

The controller 161 generates the gain control signal CN3 corresponding to the mask region signal Smsk' and supplies the gain control signal CN3 to the addition-subtraction amplifier 103. In this case, the gain of the addition-subtraction amplifier 103 becomes a value proportional to the level of the gain control signal CN3.

For example, the controller 161 generates, in a case where a display mode for improving the texture by increasing the basic gain of the addition-subtraction amplifier 103 is selected, the gain control signal CN3 corresponding to the mask region signal Smsk' in the correspondence relation shown in FIG. 2A. For this reason, in this case, since the basic gain of the addition-subtraction amplifier 103 is increased, the texture is increased as a whole. However, in the re-configured face image region, the gain control signal CN3 becomes small, and thus, the gain of the addition-subtraction amplifier 103 is relatively suppressed. Accordingly, it is possible to prevent a feeling of strangeness due to excessively emphasized texture in the face image, to thereby obtain an appropriate texture.

Further, for example, the controller 161 generates, in a case where the display mode for relatively suppressing the texture by decreasing the basic gain of the addition-subtraction amplifier 103 is selected, the gain control signal CN3 corresponding to the mask region signal Smsk' in the correspondence relation shown in FIG. 2B. For this reason, in this case, since the basic gain of the addition-subtraction amplifier 103 is decreased, the texture is relatively suppressed as a whole. However, in the re-configured face image region, the gain control signal CN3 becomes large, and thus, the gain of the addition-subtraction amplifier 103 is relatively increased. Accordingly, the texture is increased for the face image which is a main subject to thereby obtain an appropriate texture.

Further, the input luminance data Yin is supplied to the entire screen information extracting section 153. The entire screen information extracting section 153 creates the luminance histogram of the entire screen on the basis of the input luminance data Yin, and then sends the information Iahs to the controller 161. In addition, the information about the luminance histogram from among the image information Ifa about the face image which is extracted in the face information extracting section 111 and is retained in the face information retaining section 112 is sent to the controller 161.

The controller 161 basically creates the input and output characteristic curve (correction curve) CN9, on the basis of the information Iahs about the luminance histogram of the entire screen supplied from the entire screen information extracting section 153. Further, the controller 161 corrects the input and output characteristic curve CN9 so that the contrast of the face image region is broadened on the basis of the luminance histogram of the face image. In addition, the input and output characteristic curve CN9 generated in the controller 161 in this way is supplied to the contrast correcting section 151. The contrast correcting section 151 performs the contrast correction on the basis of the corrected input and output characteristic curve CN9.

As described above, in the image processing apparatus 100H shown in FIG. 21, the gain control signal CN3 of the addition-subtraction amplifier 103 is basically generated in the controller 161, on the basis of the information Iarf about the face image region obtained in the face detecting section 105. For this reason, in the face image region where the face image exists, the gain of the addition-subtraction amplifier 103 is controlled at a relatively low or high level with respect to other regions. Accordingly, regardless of the level of the overall texture due to the basic gain setting of the addition-subtraction amplifier 103, it is possible to obtain an appropriate texture for the face image.

Further, in the image processing apparatus 100H shown in FIG. 21, the image information Ifa about the face image is extracted in the face information extracting section 111, on the basis of the information Iarf about the face image region obtained in the face detecting section 105. Further, the mask region creating section 113 detects the image region in which the image corresponding to the image information Ifa about the face image exists as the re-configured image region, and creates the mask region signal Smsk on the basis of the information about the re-configured image region.

The re-configured image region also includes a face image region where the face image which is not detected in the face detecting section 105 exists. For this reason, it is possible to enable all the face image regions to be included in the re-configured image region, even in a case where there is a false negative of the face image region in a laterally-facing face image or the like in the face detecting section 105. Accordingly, even in the case of the false negative of the face image region in the face detecting section 105, it is possible to appropriately control the gain of the addition-subtraction amplifier 103 in correspondence to all the face image regions included in the input image, to thereby obtain an appropriate texture for all the face images included in the image.

Further, in the image processing apparatus 100H shown in FIG. 21, the mask region creating section 113 detects the re-configured image region from the input luminance data Yin and the input color data Cin, on the basis of the image information Ifa about the face image extracted in the face information extracting section 111. For this reason, even in a case where several frames are necessary for the detection of the face detecting section 105, the re-configured image region includes a face image region in which a face image exists in a current frame of the input image data Vin.

Accordingly, in the image processing apparatus 100H shown in FIG. 21, even in a case where the input image data Vin is moving image data and the face image region is moving, the gain of the addition-subtraction amplifier 103 can be appropriately controlled in correspondence to all the face image regions included in the input image. Thus, it is possible to obtain an appropriate texture for all the face images included in the input image.

Further, in the image processing apparatus 100H shown in FIG. 21, the image information Ifa about the face image is extracted in the face information extracting section 111, on the basis of information Iarf about the face image region obtained in the face detecting section 105. In addition, the input and output characteristic curve CN9 generated in the controller 152 is corrected so that the contrast of the face image region is broadened, on the basis of the luminance histogram from among the image information Ifa about the face image. Thus, a preferable contrast correction can be performed.

Further, in the image processing apparatus 100H shown in FIG. 21, when the input and output characteristic curve CN9 is corrected in the controller 161, the luminance histogram of the face image retained in the face information retaining section 112 is used. For this reason, even in the case of a frame in which the face image region is not detected in the face detecting section 105, the controller 161 stably generates the input and output characteristic curve CN9, and thus a stable contrast correction can be performed.

In addition, in the image processing apparatus 100H shown in FIG. 21, the contrast correcting section 151 is arranged in a path of the structure component. Thus, it is possible to perform the contrast correction, without changing the texture of the face image. Further, in the image processing apparatus 100H shown in FIG. 21, it is possible to achieve the effect due to the face information retaining section 112 and space filter 107, and the effect achieved by performing the updating of the retaining information about the face information retaining section 112 for every scene change, or the like, in a similar way to the image processing apparatus 100A shown in FIG. 9.

The present application contains subject matter related to that disclosed in Japanese Priority Patent Application JP 2009-244660 filed in the Japan Patent Office on Oct. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a data processing section which determines a face score based on a weight, wherein said weight is added to or subtracted from said face score based on a difference value between luminance values for a pair of pixels at pre-determined positions within input image data; and
a face detecting section which detects a face image in said input image data based on said determined face score.

2. The image processing apparatus according to claim 1, wherein said weight is added to said face score when said difference value is less than a threshold value, and wherein said weight is subtracted from said face score when said difference value is greater than said threshold value.

3. The image processing apparatus according to claim 1, further comprising:
a data processing section which processes said input image data and obtains output image data; and
a processing controller which controls said processing of said data processing section based on information regarding a face image region in which said face image exists, wherein said information regarding said face image region is obtained in said face detecting section.

4. The image processing apparatus according to claim 3, wherein said data processing section comprises:
a smoothing section which smoothes said input image data while keeping an edge to generate a smoothed image data;
a subtracting section which subtracts said smoothed image data from said input image data and output difference data of said smoothed image data and said input image data;
an amplifying section which amplifies said difference data output by said subtracting section; and
an adding section which adds said smoothed image data to said amplified difference data of said amplifying section to obtain said output image data,
wherein said processing controller controls a gain of said amplifying section.

5. The image processing apparatus according to claim 3, wherein said data processing section further comprises:
a high frequency component extracting section which extracts a high frequency component from said input image data;
an amplifying section which amplifies said extracted high frequency component; and
an adding section which adds output data of said amplifying section to said input image data to obtain said output image data,
wherein said processing controller controls a gain of said amplifying section.

6. The image processing apparatus according to claim 3, wherein said processing controller comprises:
a face information extracting section which extracts image information regarding said face image from said input image data based on said information regarding said face image region obtained in said face detecting section; and an image region detecting section which detects an image region in which an image corresponding to said image information extracted in said face information extracting section exists, based on said input image data, wherein said processing controller controls said processing of said data processing section based on said information regarding said image region detected in said image region detecting section.

7. The image processing apparatus according to claim 6, wherein said data processing section comprises a color saturation adjusting section which performs a color saturation adjustment process for said input image data to obtain said output image data, wherein said processing controller controls a color saturation adjustment amount in a color saturation adjusting section based on color saturation information included in said image information extracted in said face information extracting section.

8. The image processing apparatus according to claim 6, wherein said data processing section comprises a color saturation adjusting section which performs a color saturation adjustment process for said input image data to obtain said output image data, wherein said processing controller controls a color saturation adjustment amount in said color saturation adjusting section based on color saturation information included in said information regarding said image region detected in said image region detecting section and said image information extracted in said face information extracting section.

9. The image processing apparatus according to claim 6, wherein said face detecting section periodically detects said face image for a predetermined number of frames based on said input image data and obtains said face image region in which said face image exists, wherein said face information extracting section of said processing controller extracts said image information regarding said face image from said input image data based on said information regarding said face image region obtained in said face detecting section, for each frame, wherein said processing controller further comprises a face information retaining section which retains said image information extracted in said face information extracting section for each frame, and wherein said image region detecting section of said processing controller detects an image region in which an image corresponding to said image information retained in said face information retaining section exists based on said input image data.

10. The image processing apparatus according to claim 9, further comprising an image state change detecting section which detects a change in an image state based on said input image data, wherein said face information retaining section of said processing controller updates a retaining content according to said image information extracted in said face information extracting section whenever said change in said image state is detected in said image state change detecting section.

11. The image processing apparatus according to claim 9, wherein said processing controller controls a color saturation adjustment amount in a color saturation adjusting section based on color saturation information included in said image information retained in said face information retaining section.

12. The image processing apparatus according to claim 9, wherein said processing controller controls a color saturation adjustment amount in a color saturation adjusting section based on color saturation information included in said image region detected in said image region detecting section and said image information retained in said face information retaining section.

13. The image processing apparatus according to claim 9, wherein said face detecting section periodically detects said face image for a predetermined number of frames based on said input image data and obtains said information regarding said face image region in which said face image exists, wherein said face information extracting section of said processing controller extracts said image information regarding said face image from said input image data based on said information regarding said face image region obtained in said face detecting section, for each frame, wherein said processing controller further comprises a face information retaining section which retains said image information extracted in said face information extracting section, and wherein said processing controller controls a color saturation adjustment amount in a color saturation adjusting section based on color saturation information included in said image information retained in said face information retaining section.

14. The image processing apparatus according to claim 1, further comprising:

a data processing section which processes said input image data and obtains output image data; and a processing controller which controls said process of said data processing section based on information regarding a face image region in which said face image exists, wherein said information regarding said face image region is obtained in said face detecting section, wherein said data processing section comprises a color tone adjusting section which performs a color tone adjustment process for said input image data to obtain said output image data, wherein said processing controller comprises:

a face information extracting section which extracts image information regarding said face image from said input image data based on said information regarding said face image region obtained in said face detecting section; and an image region detecting section which detects an image region in which an image corresponding to said image information extracted in said face information extracting section exists, based on said input image data, and wherein said processing controller controlling a color tone adjustment amount in said color tone adjusting section based on color tone information included in said image information extracted in said face information extracting section.

15. The image processing apparatus according to claim 14, wherein said processing controller controls said color tone adjustment amount in said color tone adjusting section based on color tone information included in said information regarding said image region detected in said image region detecting section and said image information extracted in said face information extracting section.

16. The image processing apparatus according to claim 14, wherein said face detecting section periodically detects said face image for a predetermined number of frames based on said input image data and obtains said information regarding said face image region in which said face image exists, wherein said face information extracting section of said processing controller extracts said image information regarding said face image from said input image data based on said information regarding said face image region obtained in said face detecting section, for each frame, wherein said processing controller further comprises a face information retaining section which retains said image information extracted in said face information extracting section for each frame, wherein said image region detecting section of said processing controller detects an image region in which an image corresponding to said image information retained in said face information retaining section exists based on said input image data, and wherein said processing controller controls said color tone adjustment amount in said color tone adjusting section based on said color tone information included in said information regarding said image region detected in said image region detecting section and said image information retained in said face information retaining section.

17. The image processing apparatus according to claim 16, wherein said processing controller further comprises a face information retaining section which retains said image information extracted in said face information extracting section, and wherein said processing controller controls said color tone adjustment amount in said color tone adjusting section based on color tone information included in said image information retained in said face information retaining section.

18. The image processing apparatus according to claim 1, further comprising:

a data processing section which processes said input image data and obtains output image data; and a processing controller which controls said processing of said data processing section based on information regarding a face image region in which said face image exists, wherein said information regarding said face image region is obtained in said face detecting section, wherein said data processing section comprises a contrast correcting section which performs a contrast correction for said input image data based on an input and output characteristic curve for said contrast correction to obtain said output image data, wherein said processing controller comprises:

a face information extracting section which extracts image information regarding said face image from said input image data based on said information regarding said face image region obtained in said face detecting section; and a luminance information extracting section which extracts luminance information regarding an entire screen based on said input image data, and wherein said processing controller controls said input and output characteristic curve for said contrast correction used in said contrast correcting section based on luminance information included in said image information extracted in said face information extracting section and said luminance information extracted in said luminance information extracting section.

19. The image processing apparatus according to claim 18, wherein said face detecting section periodically detects said face image for a predetermined number of frames based on said input image data and obtains said information regarding said face image region in which said face image exists, wherein said face information extracting section of said processing controller extracts said image information regarding said face image from said input image data based on said information regarding said face image region obtained in said face detecting section, for each frame, wherein said processing controller further comprises a face information retaining section which retains said image information extracted in said face information extracting section, and wherein said processing controller controls said input and output characteristic curve for said contrast correction used in said contrast correcting section based on said luminance information included in said image information retained in said face information retaining section and said luminance information extracted in said luminance information extracting section.

20. The image processing apparatus according to claim 1, further comprising:

a data processing section which processes said input image data and obtains output image data; and a processing controller which controls said process of said data processing section based on information regarding a face image region in which said face image exists, wherein said information regarding said face image region is obtained in said face detecting section, wherein said data processing section comprises:

a smoothing section which smoothes said input image data while keeping an edge to generate a smoothed image data;

a subtracting section which subtracts said smoothed image data generated in said smoothing section from said input image data and output difference data of said smoothed image data and said input image data;

an amplifying section which amplifies said difference data output by said subtracting section;

a contrast correcting section which performs a contrast correction for said smoothed image data generated in said smoothing section based on an input and output characteristic curve for said contrast correction; and an adding section which adds output data of said contrast correcting section to said amplified difference data of said amplifying section to obtain said output image data, wherein said processing controller further comprises a luminance information extracting section which extracts luminance information regarding an entire screen based on said input image data, wherein said processing controller controlling a gain of said amplifying section based on said information regarding image region detected in an image region detecting section, and wherein said processing controller controls said input and output characteristic curve for said contrast correction used in said contrast correcting section based on luminance information included in image information extracted in a face information extracting section and said luminance information extracted in said luminance information extracting section.

21. The image processing apparatus according to claim 20, wherein said face detecting section periodically detects said face image for a predetermined number of frames based on said input image data and obtains said information regarding said face image region in which said face image exists, wherein said face information extracting section of said processing controller extracts said image information regarding said face image from said input image data based on said information regarding said face image region obtained in said face detecting section, for each frame, wherein said processing controller further comprises a face information retaining section which retains said image information extracted in said face information extracting section, wherein said image region detecting section of said processing controller detects an image region in which an image corresponding to said image information retained in said face information retaining section exists based on said input image data, and wherein said processing controller controls said input and output characteristic curve for said contrast correction used in said contrast correcting section based on said luminance information included in said image information retained in said face information retaining section and said luminance information extracted in said luminance information extracting section.

22. An image processing method comprising:
in an image processing apparatus:
determining a face score based on a weight, wherein said weight is added to or subtracted from said face score based on a difference value between luminance values for a pair of pixels at pre-determined positions within input image data; and
detecting a face image in said input image data based on said determined face score.

23. The image processing method according to claim 22, further comprising:
adding said weight to said face score when said difference value is less than a threshold value, and
subtracting said weight from said face score when said difference value is greater than said threshold value.

* * * * *